US012674787B2

(12) United States Patent
Babitzki et al.

(10) Patent No.: US 12,674,787 B2
(45) Date of Patent: Jul. 7, 2026

(54) METHOD AND DEVICE FOR AUTOMATIC PEAK INTEGRATION

(71) Applicant: Roche Diagnostics Operations, Inc., Indianapolis, IN (US)

(72) Inventors: Galina Babitzki, Munich (DE); Ruediger Laubender, Pullach im Isartal (DE); Julian Michely, Munich (DE); Andreas Reichert, Peissenberg (DE); Kirill Tarasov, Tutzing (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 531 days.

(21) Appl. No.: 17/649,801

(22) Filed: Feb. 3, 2022

(65) Prior Publication Data

US 2022/0155269 A1 May 19, 2022

Related U.S. Application Data

(63) Continuation of application No. PCT/EP2020/072251, filed on Aug. 7, 2020.

(30) Foreign Application Priority Data

Aug. 8, 2019 (EP) .................................... 19190813

(51) Int. Cl.
G01N 30/86 (2006.01)
G01N 30/02 (2006.01)
G01N 30/72 (2006.01)

(52) U.S. Cl.
CPC ..... G01N 30/8606 (2013.01); G01N 30/7233 (2013.01); G01N 30/8637 (2013.01); G01N 2030/027 (2013.01)

(58) Field of Classification Search
CPC ........................ G01N 30/02; G01N 2201/1248
See application file for complete search history.

(56) References Cited

U.S. PATENT DOCUMENTS 6,438,499 B1    8/2002 Hayashi
2006/0255258 A1* 11/2006 Wang ................. G01N 30/8665
250/282

(Continued)

FOREIGN PATENT DOCUMENTS

CA          2604209 A1    10/2006
CN       105606742 A     5/2016
(Continued)

OTHER PUBLICATIONS

Ranjbar MR, Di Poto C, Wang Y, Ressom HW. SIMAT: GC-SIM-MS data analysis tool. BMC Bioinformatics. Aug. 19, 2015;16:259. doi: 10.1186/s12859-015-0681-2. PMID: 26283310; PMCID: PMC4539696. (Year: 2015).*

(Continued)

*Primary Examiner* — Catherine T. Rastovski
*Assistant Examiner* — Brian Butler Geiss
(74) *Attorney, Agent, or Firm* — Taft Stettinius & Hollister LLP

(57) ABSTRACT

A computer implemented method for automatic peak integration of at least one chromatogram of at least one sample. The method comprises retrieving at least one chromatogram of the chemical related substance and at least one chromatogram of the analyte; evaluating the chromatogram of the chemical related substance, wherein the evaluating comprises determining at least one initial value for analyte retention time by determining retention time of the chemical related substance and adding the retention time of the chemical related substance with a pre-determined or pre-defined constant offset and/or multiplying the retention time of the chemical related substance with a pre-determined or (Continued)

pre-defined constant factor; evaluating the chromatogram of the analyte, wherein the evaluating comprises at least one position determining step; and at least one peak integration step, wherein analyte peak area and analyte peak shape are determined by applying at least one fitting analysis to the chromatogram of the analyte.

17 Claims, 5 Drawing Sheets

(56)                    References Cited

U.S. PATENT DOCUMENTS

| | | | | |
|---|---|---|---|---|
| 2009/0294645 | A1* | 12/2009 | Gorenstein | H01J 49/02 |
| | | | | 250/288 |
| 2013/0080073 | A1* | 3/2013 | de Corral | G01N 30/86 |
| | | | | 702/23 |
| 2014/0260509 | A1* | 9/2014 | Pohl | G01N 30/8665 |
| | | | | 73/1.02 |

FOREIGN PATENT DOCUMENTS

| | | | |
|---|---|---|---|
| EP | 3271715 | A1 | 1/2018 |
| EP | 3425369 | A1 | 1/2019 |
| JP | 2012163475 | A | 8/2012 |
| KR | 101654776 | B1 | 8/2016 |
| WO | 2016/149316 | A1 | 9/2016 |
| WO | 2018/229811 | A1 | 12/2018 |

OTHER PUBLICATIONS

Adamo, "Quadrupoles: How Do They Work?" (2020), TRACES Center, https://www.utsc.utoronto.ca/~traceslab/PDFs/MassSpec_QuadsInfo.pdf (Year: 2020).*

"What are Quantifier and Qualifier Ions in Mass Spectrometry?", (2023), https://community.agilent.com/knowledge/mass-spec-software-portal/kmp/mass-spec-software-articles/kp817.what-are-quantifier-and-qualifier-ions-in-mass-spectrometry- (Year: 2023).*

Helpful Info (2019) Department of Chemistry Mass Spectrometry Core Laboratory. UNC-Chapel Hill. Available at: https://mscore.web.unc.edu/helpful-info/. (Year: 2019).*

Di Marco, Valerio B. and Bombi, G. Giorgio, Mathematical functions for the representation of chromatographic peaks, Journal of Chromatography A, 2001, pp. 1-30, vol. 931.

Gladney, H. M. et al., Computer-Assisted Gas-Liquid Chromatography, Analytical Chemistry, 1969, pp. 883-888, vol. 41, No. 7.

Goodman, Keith J. and Brenna, J. Thomas, Curve Fitting for Restoration of Accuracy for Overlapping Peaks in Gas Chromatography/Combustion Isotope Ratio Mass Spectrometry, Analytical Chemistry, 1994, pp. 1294-1301, vol. 66, No. 8.

International Search Report issued Oct. 21, 2020, in Application No. PCT/EP2020/072251, 3 pp.

MassLynx NT User's Guide, Micromass UK Limited, 2002, Micromass Part No. 6666661, 502 pp., Version 4.0.

Phillips, Mindy L. and White, Robert L., Dependence of Chromatogram Peak Areas Obtained by Curve-Fitting on the Choice of Peak Shape Function, Journal of Chromatographic Science, 1997, pp. 75-81, vol. 35, No. 2.

Pápai, Zs. and Pap, T. L., Determination of chromatographic peak parameters by non-linear curve fitting using statistical moments, Analyst, 2002, pp. 494-498, vol. 127, No. 4.

Schreiber, Andre and Zou, Yun Yun, How to Verify and Update Retention Times in Scheduled MRM™ Acquisition Methods using Analyst® and MultiQuant™ Software, AB Sciex, 2011, 5 pp.

Chinese Search Report; National Intellectual Property Administration, P. R. China; Chinese Application No. 202080056252.X; May 31, 2024; 2 pages.

Written Opinion of the International Searching Authority, European Patent Office, International Patent Application No. PCT/EP2020/072251, Feb. 11, 2021, 10 pages.

International Preliminary Report on Patentability, The International Bureau of WIPO, International Patent Application No. PCT/EP2020/072251, Feb. 17, 2022, 11 pages.

Michael Martin, Fundamental Retention Equation in Gradient Elution Liquid Chromatography, Journal of Liquid Chromatography, vol. 11, 1988. Issue 9-10. pp. 1809-1826. Abstract only.

* cited by examiner

METHOD AND DEVICE FOR AUTOMATIC PEAK INTEGRATION

CROSS-REFERENCE TO RELATED APPLICATIONS

This application is a continuation of International Patent Application No. PCT/EP2020/072251, filed 7 Aug. 2020, which claims priority to European Patent Application No. 19190813.6, filed 8 Aug. 2019, the disclosures of which are hereby incorporated by reference in their entirety.

TECHNICAL FIELD

The present disclosure relates to a computer implemented method for automatic peak integration of at least one chromatogram of at least one sample, a computer-implementable processing line and a mass spectrometry system.

BACKGROUND

Peak finding and evaluation in liquid chromatography-mass spectrometry (LC-MS) or mass spectrometry (MS) generally requires user interaction or a revision by an expert user such as for selecting or assigning the correct peak. Since several years there is a need for automation of peak finding and evaluation such as to reduce user interaction and thus to enhance reliability of the measurement.

Peaks in LC-MS or mass spectrometry-based chromatography experience time shifts and/or variations in peak shape. Such shifts and variations can result from matrix effects and system performance loss such as degradation of LC columns. Known approaches for automation of peak picking use a fixed retention time target and a fixed retention time window to specify a peak of interest that should be identified as a signal. Such strategy is implemented for example in Multi Quant Sciex Software, see https://sciex.com/Documents/Downloads/Literature/verify-update-retention-times.pdf. Because of retention time shifts, such approaches can lead to errors, forcing users to manually assign correct peaks.

Similar problems can occur in fitting analytical peak shape models to calculate peak area. Known methods such as the ASCENT software by Indigo BioAutomation, Inc., see https://www.indigobio.com, perform independent shape fits on the analyte and internal standard signals. In case of low analyte concentrations, complex background signal, high noise level or interference peaks, this frequently can lead to erroneous results for the analyte shape fit. This shortcoming makes full automation of the peak integration impossible and makes a revision by an expert user and manual result adjustment necessary for measurements with complex chromatography characteristics.

EP 3 271 715 A1 describes screening techniques for qualitatively and quantitatively detecting analytes in biological specimens using threshold analyte calibration. Specifically, it is described to consider shifting retention time of the internal standards for the peak picking in EP 3 271 715 A1. Moreover, Waters MassLynx 4.0 manual, http://www.ecs.umass.edu/eve/facilities/equipment/Quattromicro/MassLynx%20Version %204.0%20User's %20Guide.pdf proposes to consider additional properties of the internal standard peak such as peak width and peak asymmetry. However, considering shifting retention time of the internal standards only as proposed in EP 3 271 715 A1 or even peak width and asymmetry as proposed in the Waters MassLynx 4.0 manual may not be sufficient for reliable peak finding and evaluation to allow automation without the need of any user interaction or review.

SUMMARY

Although the embodiments of the present disclosure are not limited to specific advantages or functionality, it is noted that the present disclosure provides methods and devices for automatic peak integration, which avoid the above-described disadvantages of known methods and devices. In particular, the method and the device allow reliable and completely automatic peak integration, in particular without the need of user interaction.

In accordance with one embodiment of the present disclosure, a computer implemented method for automatic peak integration of at least one chromatogram of at least one sample is provided, wherein the sample comprises at least one analyte and at least one chemical related substance, wherein the method comprises the following steps: a) retrieving at least one chromatogram of the chemical related substance and at least one chromatogram of the analyte; b) evaluating the chromatogram of the chemical related substance, wherein the evaluating comprises b1) determining at least one initial value for analyte retention time by determining retention time of the chemical related substance and adding the retention time of the chemical related substance with a pre-determined or pre-defined constant offset and/or multiplying the retention time of the chemical related substance with a pre-determined or pre-defined constant factor, b2) determining at least one initial value for analyte peak shape parameters by determining peak shape parameters of at least one peak of the chemical related substance chromatogram; and c) evaluating the chromatogram of the analyte, wherein the evaluating comprises c1) at least one position determining step, wherein the analyte retention time is determined by considering the initial value of the retention time of the chemical related substance, and c2) at least one peak integration step, wherein analyte peak area and analyte peak shape are determined by applying at least one fitting analysis to the chromatogram of the analyte by considering the initial value for analyte peak shape parameters and the analyte retention time.

In accordance with another embodiment of the present disclosure, a computer-implementable processing line for automatic peak integration of at least one chromatogram of at least one sample is provided, wherein the sample comprises at least one analyte and at least one chemical related substance, and wherein the processing line comprises: at least one data collector configured for retrieving at least one chromatogram of the chemical related substance and at least one chromatogram of the analyte; and at least one evaluation device configured for evaluating the chromatogram of the chemical related substance and the chromatogram of the analyte; wherein the evaluation device comprises at least one retention time processor configured for determining at least one initial value for analyte retention time by determining retention time of the chemical related substance, wherein the evaluation device comprises at least one adder configured for adding the retention time of the chemical related substance with a pre-determined or pre-defined constant offset and/or at least one multiplier configured for multiplying the retention time of the chemical related substance with a pre-determined or pre-defined constant factor, wherein the evaluation device comprises at least one position determining device configured for determining the analyte retention time by considering the initial value of the retention time of the chemical related substance, wherein the evaluation device furthermore comprises at least one peak processor configured for determining at least one initial value for analyte peak shape parameters by determining peak shape parameters of at least one peak of the chemical related substance chromatogram, and wherein the evaluation device comprises at least one fitting device configured for determining analyte peak area and analyte peak shape by applying at least one fitting analysis to the chromatogram of the analyte by considering the initial value for analyte peak shape parameters and the analyte retention time.

In accordance with yet another embodiment of the present disclosure, a mass spectrometry system is provided comprising at least one mass spectrometry device comprising at least one mass filter and at least one detector; and at least one computer-implementable processing line according to an embodiment of the instant disclosure.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where the like structure is indicated with the reference number and in which.

Figure 1:
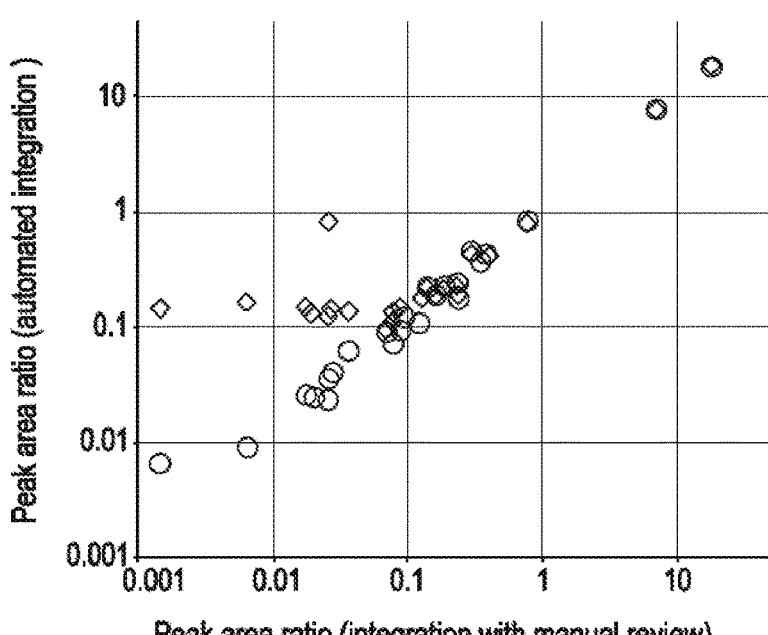
FIG. 1 shows a comparison of a method for automated peak integration as known in the art and an integration with manual review.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The present disclosure may, as the skilled person will recognize, be performed by using alternative features. Similarly, features introduced by "in an embodiment of the present disclosure" or similar expressions are intended to be optional features, without any restriction regarding alternative embodiments of the present disclosure, without any restrictions regarding the scope of the present disclosure and without any restriction regarding the possibility of combining the features introduced in such way with other optional or non-optional features of the present disclosure.

In a first aspect of the present disclosure, a computer implemented method for automatic peak integration of at least one chromatogram of at least one sample is disclosed.

The term "computer implemented method" as used herein is a broad term and is to be given its ordinary and customary meaning to a person of ordinary skill in the art and is not to be limited to a special or customized meaning. The term specifically may refer, without limitation, to a method involving at least one computer and/or at least one computer network. The computer and/or computer network may comprise at least one processor which is configured for performing at least one of the method steps of the method according to the present disclosure. Typically each of the method steps is performed by the computer and/or computer network. The method may be performed completely automatically, specifically without user interaction. The term "automatically" as used herein is a broad term and is to be given its ordinary and customary meaning to a person of ordinary skill in the art and is not to be limited to a special or customized meaning. The term specifically may refer, without limitation, to a process which is performed completely by means of at least one computer and/or computer network and/or machine, in particular without manual action and/or interaction with a user.

The term "chromatogram" as used herein is a broad term and is to be given its ordinary and customary meaning to a person of ordinary skill in the art and is not to be limited to a special or customized meaning. The term specifically may refer, without limitation, to a visual result or outcome of a separation process separating components of the sample. The chromatogram may refer to an intensity distribution over time generated during at least one chromatography run. The chromatogram may be or may comprise a diagram with the retention time of the sample components on the x-axis and intensity on the y-axis. The chromatogram may be determined by using at least one mass spectrometry device, for example at least one liquid chromatography mass spectrometry device. As used herein, the term "liquid chromatography mass spectrometry device" is a broad term and is to be given its ordinary and customary meaning to a person of ordinary skill in the art and is not to be limited to a special or customized meaning. The term specifically may refer, without limitation, to a combination of liquid chromatography with mass spectrometry. The liquid chromatography mass spectrometry device may be or may comprise at least one high-performance liquid chromatography (HPLC) device or at least one micro liquid chromatography (μLC) device. The liquid chromatography mass spectrometry device may comprise a liquid chromatography (LC) device and a mass spectrometry (MS) device, wherein the LC device and the MS are coupled via at least one interface. As used herein, the term "liquid chromatography (LC) device" is a broad term and is to be given its ordinary and customary meaning to a person of ordinary skill in the art and is not to be limited to a special or customized meaning. The term specifically may refer, without limitation, to an analytical module configured to separate one or more analytes of interest of a sample from other components of the sample for detection of the one or more analytes with the mass spectrometry device. The LC device may comprise at least one LC column. For example, the LC device may be a single-column LC device or a multi-column LC device having a plurality of LC columns. The LC column may have a stationary phase through which a mobile phase is pumped in order to separate and/or elute and/or transfer the analytes of interest. As used herein, the term "mass spectrometry device" is a broad term and is to be given its ordinary and customary meaning to a person of ordinary skill in the art and is not to be limited to a special or customized meaning. The term specifically may refer, without limitation, to a mass analyzer configured for detecting at least one analyte based on mass to charge ratio. The mass spectrometry device may be or may comprise at least one quadrupole mass spectrometry device. The interface coupling the LC device and the MS may comprise at least one ionization source configured for generating of molecular ions and for transferring of the molecular ions into the gas phase.

The term "peak" as used herein is a broad term and is to be given its ordinary and customary meaning to a person of ordinary skill in the art and is not to be limited to a special or customized meaning. The term specifically may refer, without limitation, to at least one local maximum of the chromatogram. The term "signal peak" may be used for denoting an identified peak of the analyte of interest. The term "peak integration" as used herein is a broad term and is to be given its ordinary and customary meaning to a person of ordinary skill in the art and is not to be limited to a special or customized meaning. The term specifically may refer, without limitation, to at least one mathematical operation and/or mathematical algorithm for determining a peak area enclosed by a peak of the chromatogram. Specifically, the integration of the peak may comprise identification and/or measurement of curve characteristics of the chromatogram. The peak integration may comprise one or more of peak detection, peak finding, peak identification, peak fitting, peak evaluation, determining peak start and/or peak end, determining of background, determining of basis line. The peak integration may allow determining of one or more of peak area, retention time, peak height, and peak width. The term "automatic peak integration" as used herein is a broad term and is to be given its ordinary and customary meaning to a person of ordinary skill in the art and is not to be limited to a special or customized meaning. The term specifically may refer, without limitation, to peak integration which is performed non-manual but by at least one computer and/or computer network and/or machine. Specifically, the automatic peak integration may be performed without manual action or interaction with a user. In particular, peak identification and/or peak detection and/or determining of peak area may be performed non-manual and without manual action or interaction with a user.

As used herein, the term "sample" is a broad term and is to be given its ordinary and customary meaning to a person of ordinary skill in the art and is not to be limited to a special or customized meaning. The term specifically may refer, without limitation, to an arbitrary sample such as a biological sample, also called test sample. For example, the test sample may be selected from the group consisting of: a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue, cells or the like. The sample may be used directly as obtained from the respective source or may be subject of a pretreatment and/or sample preparation workflow. The sample comprises at least one analyte and at least one chemical related substance. For example, analytes of interest may be vitamin D, drugs of abuse, therapeutic drugs, hormones, and metabolites in general. As used herein, the term "chemical related substance" is a broad term and is to be given its ordinary and customary meaning to a person of ordinary skill in the art and is not to be limited to a special or customized meaning. The term specifically may refer, without limitation, to a substance having mass to charge ratio similar to the analyte of interest. For example, the chemical related substance may be at least one internal standard and/or at least one substance used as quantifier. The method according to the present disclosure allows for reliable peak integration even for low intensity peaks, high noise levels or frequent interferences. Specifically, the method proposes to use for evaluation of the chromatogram of the analyte of interest input or start values determined from a further chromatogram of a chemical related substance of the same measurement for which sufficient high intensity peaks, low noise level and low frequent interferences can be guaranteed. For example, the method can be used for enhancing integration of an analyte chromatogram on the basis of the results obtained from the chromatogram of the internal standard. For example, the method can be used for enhancing integration of a qualifier chromatogram on the basis of the results obtained from the quantifier chromatogram. As used herein, the term "internal standard" is a broad term and is to be given its ordinary and customary meaning to a person of ordinary skill in the art and is not to be limited to a special or customized meaning. The term specifically may refer, without limitation, to an analyte which is present with a known concentration in the sample. The internal standard sample may be a sample comprising at least one internal standard substance with a known such as a pre-determined concentration. Internal standards may be almost identical to the analyte. The internal standard substance may be similar to the analyte of interest such as deuterated molecules or an isotopically labeled version of the analyte of interest. For further details with respect to the sample, reference is made, e.g., to EP 3 425 369 A1, the full disclosure is included herewith by reference. Other analytes of interest are possible.

The sample may be pretreated by adding a chemical related substance such as an internal standard and/or by being diluted with another solution and/or by having being mixed with reagents or the like. The method may comprise at least one sample preparation step. In the sample preparation step the at least one chemical related substance such as the internal standard may be added to the sample of the analyte. The sample comprising the analyte may be spiked with the chemical related substance. For example, chemical related substance may be added to the sample with a predefined concentration. The chemical related substance may be selected such that it is easily identifiable under normal operating conditions of the mass spectrometry device. The concentration of the chemical related substance such as of the internal standard may be pre-determined and significantly higher than the concentration of the analyte.

The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises the following steps:

a) retrieving at least one chromatogram of the chemical related substance and at least one chromatogram of the analyte;

b) evaluating the chromatogram of the chemical related substance, wherein the evaluating comprises b1) determining at least one initial value for analyte retention time by determining retention time of the chemical related substance and adding the retention time of the chemical related substance with a pre-determined or pre-defined constant offset and/or multiplying the retention time of the chemical related substance with a pre-determined or pre-defined constant factor, b2) determining at least one initial value for analyte peak shape parameters by determining peak shape parameters of at least one peak of the chemical related substance chromatogram;

c) evaluating the chromatogram of the analyte, wherein the evaluating comprises c1) at least one position determining step, wherein the analyte retention time is determined by considering the initial value of the retention time of the chemical related substance;

c2) at least one peak integration step, wherein analyte peak area and analyte peak shape are determined by applying at least one fitting analysis to the chromatogram of the analyte by considering the initial value for analyte peak shape parameters and the analyte retention time.

The method steps a) to c) may be performed fully automatic. For example, the method steps may be performed by at least one computer-implementable processing line which will be outlined in detail below.

An additional embodiment of the method includes the determination of error intervals for the peak retention time and peak shape parameters. In detail, the additional embodiment comprises the following steps:

a) As described above b) As described above, where the determination of the initial value for analyte retention time includes the determination of its error interval.

c) As described above. Additionally, the position determining step c1) includes the additional requirement that the analyte position may deviate from the initial value by less than the analyte retention time error interval determined in step b1). Furthermore, the peak integration step includes the additional requirement that the analyte peak shape parameters may deviate from the initial value by less than the peak shape parameter error interval determined in step b2).

As used herein, the term "retrieving at least one chromatogram" is a broad term and is to be given its ordinary and customary meaning to a person of ordinary skill in the art and is not to be limited to a special or customized meaning.

The term specifically may refer, without limitation, to one or more of receiving, downloading, accessing, determining, detecting, and recording the at least one chromatogram. For example, the chromatogram may be retrieved by downloading and/or accessing the chromatogram from at least one database such as of a detector or of a cloud. For example, the chromatogram may be retrieved by performing at least one chromatography run. The chromatogram of the chemical related substance may be a chromatogram comprising at least one signal corresponding to the chemical related substance such as of the internal standard. The chromatogram of the analyte may be a chromatogram comprising at least one signal corresponding to the analyte of interest.

The method comprises evaluating the chromatogram of the chemical related substance.

The method may comprise at least one preprocessing step. The preprocessing may comprise one or more of: selecting at least one region of interest in the chromatogram; selecting at least one predefined retention time interval; at least one smoothing step comprising applying one or more of a moving average filter, a Gaussian filter, a discrete wavelet denoising, a Savitzky-Golay smoothing, a Loess smoothing; at least one background subtraction step comprising one or more of an asymmetric weighted least squares fit with regularization, applying a morphological top hat filter, a discrete or continuous wavelet base background determination, determining a moving average minima.

The evaluating comprises determining at least one initial value for analyte retention time by determining retention time of the chemical related substance. For each sample peak retention time and/or additional peak shape parameters of the chemical related substance such as peak width and/or peak asymmetry may be determined. Due to the measurement principle of the mass spectrometry device, the retention time of the analyte may be either identical to its corresponding chemical related substance or can be calculated from the chemical related substance such as by addition of a constant difference and/or multiplication with a constant factor. Therefore, using the chemical related substance retention time and, if applicable, some constant offset and/or factor may enable correct identification of analyte peaks even if retention time is shifting.

The chemical related substance which is added to the sample with a predefined concentration may be easily identifiable under normal operating condition of the mass spectrometry device. The method may comprise performing at least one error check, wherein the chemical related substance signal is tested. The error check may be used to ensure that the correct peak is interpreted as a chemical related substance signal.

As used herein, the term "initial value for analyte retention time" is a broad term and is to be given its ordinary and customary meaning to a person of ordinary skill in the art and is not to be limited to a special or customized meaning. The term specifically may refer, without limitation, to a start value and/or input value for the determination of the analyte retention time from the chromatogram of the analyte.

In an additional embodiment of the method, initial value for analyte retention time may also comprise the corresponding error interval. The term "error interval" is a broad term and is to be given its ordinary and customary meaning to a person of ordinary skill in the art and is not to be limited to a special or customized meaning. The term specifically may refer, without limitation, to the confidence interval of analyte retention time determination result.

For determining the initial value for analyte retention time, firstly, the retention time of the chemical related substance may be determined. This may comprise determining of at least one local intensity maximum within a predefined retention time interval. The predefined retention time interval used for determining the retention time of the chemical related substance may depend on one or more of expected retention time of the chemical related substance, chromatographic peak width of the chemical related substance, a level of chemical similarity of the chemical related substance and analyte of interest, e.g., whether deuterated, C13-labeled or other chemical related substance is used, and a chromatographic noise level. The retention time of the determined local intensity maximum may be determined from the chromatogram and may be used, after addition of a constant offset and/or multiplication with a constant factor, as initial value for the analyte retention time. The determining of the local intensity maximum may be performed considering a predefined interval for a quantifier-to-qualifier ratio at the position of the maximum. Specifically, local maxima that correspond to peaks related to the analyte of interest are identified due to having a quantifier-to-qualifier ratio close to the value which is characteristic for the analyte of interest. As used herein, the term "quantifier-to-qualifier ratio" is a broad term and is to be given its ordinary and customary meaning to a person of ordinary skill in the art and is not to be limited to a special or customized meaning. The term specifically may refer, without limitation, to a ratio of signal of the ion used for quantification and signal of the ion used for identity confirmation. Additionally or alternatively, the determining of the retention time of the chemical related substance may comprise determining of patterns of multiple local maxima within the predefined retention time interval, wherein the patterns have a predefined distance between the maxima. Such peak patterns may be characteristic for certain analytes of interest measured with a given LC-MS measurement protocol and can therefore be used to discriminate peaks related to the analyte of interest from peaks related to other substances. The determining of the patterns of multiple local maxima may be performed considering a predefined interval for a quantifier-to-qualifier ratio at the position of the maximum.

The evaluating comprises adding the retention time of the chemical related substance with a pre-determined or pre-defined constant offset and/or multiplying the retention time of the chemical related substance with a pre-determined or pre-defined constant factor. As used herein, the term "constant offset" is a broad term and is to be given its ordinary and customary meaning to a person of ordinary skill in the art and is not to be limited to a special or customized meaning. The term specifically may refer, without limitation, to additional retention time which is added to the determined retention time of the chemical related substance. For example, the retention time of the chemical related substance may be $t_1$, wherein initial value for analyte retention time $t_{ini}$ may be determined by $t_{ini}=t_1+t_{off}$, wherein $t_{off}$ is the constant offset. In an embodiment of the method, the initial value for analyte retention time $t_{ini}$ may be determined by $t_{ini}=t_1+t_{off}+\varepsilon$, wherein $t_{off}$ is the constant offset and c denotes the error interval of the analyte retention time.

The constant offset may be pre-determined or pre-defined by comparing determined retention time of the chemical related substance with at least one predicted or expected retention time of the chemical related substance. The predicted or expected retention time of the chemical related substance may be a known retention time for the chemical related substance such as pre-defined or pre-determined retention time under certain conditions, in particular temperature conditions. For example, the comparing may comprise subtracting the determined retention time of the chemical related substance from the predicted or expected retention time. A deviation of the predicted or expected retention time from the determined retention time of the chemical related substance may be used as constant offset. As used herein, the term "constant factor" is a broad term and is to be given its ordinary and customary meaning to a person of ordinary skill in the art and is not to be limited to a special or customized meaning. The term specifically may refer, without limitation, to additional retention time which is applied to the determined retention time of the chemical related substance by multiplication. For example, the retention time of the chemical related substance may be $t_1$, wherein initial value for analyte retention time $t_{ini}$ may be determined by $t_{ini}=t_1 * t_{fac}$, wherein $t_{fac}$ is the constant factor. In an embodiment of the method, the initial value for analyte retention time $t_{ini}$ may be determined by $t_{ini}=(t_1 * t_{fac}) \pm \varepsilon$, wherein $t_{fac}$ is the constant factor and $\varepsilon$ denotes the error interval of the analyte retention time.

The constant factor may be pre-determined or pre-defined by comparing determined retention time of the chemical related substance with at least one predicted or expected retention time of the chemical related substance. The predicted or expected retention time of the chemical related substance may be a known retention time for the chemical related substance such as pre-defined or pre-determined retention time under certain conditions, in particular temperature conditions. For example, the comparing may comprise generating at least one ratio of the determined retention time of the chemical related substance and the predicted or expected retention time. The ratio of the predicted or expected retention time and the determined retention time of the chemical related substance may be used as constant factor. The use of a constant offset may lead to satisfactory results for small retention time shifts that occur, e.g., due to external factors such as varying instrument temperature or limited accuracy of the gradient settings in the chromatographic method. For effects which may cause larger retention time shifts such as LC column aging, the use of a constant factor may offer superior performance compared to applying a constant offset. As outlined above, the determining of the initial value for analyte retention time may comprise determining of the at least one local intensity maximum within the predefined retention time interval. The initial value for analyte retention time may be determined by adjusting the predefined retention time interval according to the determined local maximum corrected by the pre-determined or pre-defined constant offset and/or the pre-determined or pre-defined constant factor.

The evaluation of the chromatogram of the chemical related substance comprises determining at least one initial value for analyte peak shape parameters by determining peak shape parameters of at least one peak of the chemical related substance chromatogram. Similar to peak retention time, the measurement principle of the mass spectrometry device may lead to the analyte peak shape being similar to the chemical related substance peak shape due to the similarity of both compounds. As outlined above, the chemical related substance signal is very well controlled since this compound is added to the sample at a predefined and relatively high concentration such that reliable peak shape fit results are ensured. The result of the chemical related substance shape can be used as an input to the subsequent shape determination for the analyte of interest and tight constraints on deviations from this input can be placed due to the known similarity of chemical related substance and analyte peak shapes. As used herein, the term "initial value for analyte peak shape parameters" is a broad term and is to be given its ordinary and customary meaning to a person of ordinary skill in the art and is not to be limited to a special or customized meaning. The term specifically may refer, without limitation, to start values and/or input values for the determination of the analyte peak shape from the chromatogram of the analyte.

In an additional embodiment of the method, initial value for initial value for analyte peak shape parameters may also comprise the corresponding error interval. The term "error interval" is a broad term and is to be given its ordinary and customary meaning to a person of ordinary skill in the art and is not to be limited to a special or customized meaning. The term specifically may refer, without limitation, to the confidence interval of the determination of the initial value for analyte peak shape parameters.

The determining of the at least one initial value for analyte peak shape parameters may comprise fitting at least one peak of the chemical related substance chromatogram. The fitting may comprise using at least one curve fitting technique such as one or more of polynomial interpolation, Gauss-Newton algorithm, Fourier-Transformation and the like. For example, the chromatogram of the chemical related substance may be fitted using at least one exponentially modified Gaussian function. For example, the fitting may comprise using at least one fitting function as described in "Mathematical functions for the representation of chromatographic peaks", Valerio B. Di Marco, G. Giorgio Bombi, Journal of Chromatography A, 931 (2001) 1-30. Using one or more of these curve fitting techniques a peak is fitted for the chemical related substance chromatogram. From the curve fitting techniques, peak parameters of the chemical related substance peak can be determined. The peak parameters may comprise one or more of peak width, peak asymmetry, peak position, basis line and the like. The determined peak parameters from the chromatogram of the chemical related substance may be used to estimate the peak parameters of the analyte peak by expanding them to an interval with so-called tolerance intervals.

The method may comprise determining at least one tolerance interval of the respective peak parameter. The tolerance interval $p \pm \varepsilon$ may be given by the respective determined initial value p for analyte peak shape parameters and an error interval $\varepsilon$. The error interval may depend on resolution of the detector, fit error, and the level of chemical similarity of the chemical related substance and analyte of interest, e.g., whether deuterated, C13-labeled or other chemical related substance is used. The tolerance interval may be different for the different peak shape parameters.

In an embodiment of the method, the error interval $\varepsilon$ of the analyte peak shape parameters may be set to the error interval of the peak shape parameters of the chemical related substance.

The method comprises evaluating the chromatogram of the analyte. The evaluating of the chromatogram of the analyte may comprise at least one preprocessing step. The preprocessing may comprise one or more of: selecting at least one region of interest in the chromatogram; selecting at least one predefined retention time interval; at least one smoothing step comprising applying one or more of a moving average filter, a Gaussian filter, a discrete wavelet denoising, a Savitzky-Golay smoothing, a Loess smoothing; at least one background subtraction step comprising one or more of an asymmetric weighted least squares fit with regularization, applying a morphological top hat filter, a discrete or continuous wavelet base background determination, determining a moving average minima. The preprocessing can be identical or different to the preprocessing applied to the chromatogram of the chemical related substance.

The evaluating comprises at least one position determining step, wherein the analyte retention time is determined by considering the initial value of the retention time of the chemical related substance. The analyte retention time may be determined by using at least one curve fitting technique. The initial value for analyte retention time may be used as start value for the curve fitting. Given the initial value of the analyte retention time determined from the chemical related substance chromatogram the analyte retention time can be determined, e.g., by using at least one curve fitting technique. The fitting may comprise using at least one curve fitting technique such as one or more of polynomial interpolation, Gauss-Newton algorithm, Fourier-Transformation and the like. For example, the fitting may comprise using at least one fitting function as described in "Mathematical functions for the representation of chromatographic peaks", Valerio B. Di Marco, G. Giorgio Bombi, Journal of Chromatography A, 931 (2001) 1-30. The analyte retention time may be determined using a narrow tolerance interval around the initial value of the retention time. For example, the tolerance interval $t \pm \varepsilon_t$ is given by the respective determined initial value t for analyte peak retention time and an error interval $\pm \varepsilon_t$.

In an embodiment of the method, the error interval $\varepsilon$ of the analyte retention time may be set to the error interval of the retention time of the chemical related substance. The error interval may depend on resolution of the detector, the chromatographic peak width of the analyte of interest and the chemical related substance, the level of chemical similarity of the chemical related substance and analyte of interest, e.g., whether deuterated, C13-labeled or other chemical related substance is used, and the chromatographic noise level. The width of the tolerance interval $t \pm \varepsilon_t$ may be generally smaller than the chromatographic peak width of the analyte of interest.

The evaluating further comprises at least one peak integration step, wherein analyte peak area and analyte peak shape are determined by applying at least one fitting analysis to the chromatogram of the analyte by considering the initial value for analyte peak shape parameters and the analyte retention time. Using the determined analyte retention time and the initial value of the analyte peak shape parameters a curve can be fitted to the chromatogram of the analyte to determine the analyte peak area and peak shape. In the peak integration step the analyte chromatogram may be fitted using at least one exponentially modified Gaussian function. For example, the fitting may comprise using at least one fitting function as described in "Mathematical functions for the representation of chromatographic peaks", Valerio B. Di Marco, G. Giorgio Bombi, Journal of Chromatography A, 931 (2001) 1-30. The analyte peak area and analyte peak shape may be determined using the tolerance interval $p \pm \varepsilon$ around the initial value of the respective analyte peak shape parameter, as described above.

Use of retention time and peak shape parameters of the chemical related substance for evaluating the analyte chromatogram may lead to more accurate analyte peak area determination especially in case of low analyte concentration, complex background, high noise level and interference peaks. Thus, the method according to the present disclosure enables reliable automation of peak integration without the need for revision by an expert user and manual adjustment.

Additionally to the use of an internal standard chromatogram, parameters of other fragments such as quantifiers of the analyte and/or the internal standard may be used for quantitation and/or error checking.

In a further aspect, a computer program including computer-executable instructions for performing the method according to any one of the embodiments as described herein is disclosed, specifically method steps a) to c), when the program is executed on a computer or computer network, specifically on a processor.

Thus, generally speaking, disclosed and proposed herein is a computer program including computer-executable instructions for performing the method according to the present disclosure in one or more of the embodiments enclosed herein when the program is executed on a computer or computer network. Specifically, the computer program may be stored on a computer-readable data carrier. Thus, specifically, one, more than one or even all of the method steps as indicated above may be performed by using a computer or a computer network, typically by using a computer program. The computer specifically may be fully or partially integrated into the mass spectrometry device, and the computer programs specifically may be embodied as a software. Alternatively, however, at least part of the computer may also be located outside the mass spectrometry device.

Further disclosed and proposed herein is a computer program product having program code means, in order to perform the method according to the present disclosure in one or more of the embodiments enclosed herein when the program is executed on a computer or computer network, e.g., one or more of the method steps mentioned above. Specifically, the program code means may be stored on a computer-readable data carrier.

Further disclosed and proposed herein is a data carrier having a data structure stored thereon, which, after loading into a computer or computer network, such as into a working memory or main memory of the computer or computer network, may execute the method according to one or more of the embodiments disclosed herein, specifically one or more of the method steps mentioned above.

Further disclosed and proposed herein is a computer program product with program code means stored on a machine-readable carrier, in order to perform the method according to one or more of the embodiments disclosed herein, when the program is executed on a computer or computer network, specifically one or more of the method steps mentioned above. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, for performing the method according to one or more of the embodiments disclosed herein, specifically one or more of the method steps mentioned above.

Specifically, further disclosed herein are:

a computer or computer network comprising at least one processor, wherein the processor is adapted to perform the method according to one of the embodiments described in this description, a computer loadable data structure that is adapted to perform the method according to one of the embodiments described in this description while the data structure is being executed on a computer, a computer program, wherein the computer program is adapted to perform the method according to one of the embodiments described in this description while the program is being executed on a computer, a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

In a further aspect of the present disclosure, computer-implementable processing line for automatic peak integration of at least one chromatogram of at least one sample is disclosed. The sample comprises at least one analyte and at least one chemical related substance. The processing line comprises at least one data collector configured for retrieving at least one chromatogram of the chemical related substance and at least one chromatogram of the analyte;

at least one evaluation device configured for evaluating the chromatogram of the chemical related substance and the chromatogram of the analyte, wherein the evaluation device comprises at least one retention time processor configured for determining at least one initial value for analyte retention time by determining retention time of the chemical related substance, wherein the evaluation device comprises at least one adder configured for adding the retention time of the chemical related substance with a pre-determined or pre-defined constant offset and/or at least one multiplier configured for multiplying the retention time of the chemical related substance with a pre-determined or pre-defined constant factor, wherein the evaluation device comprises at least one position determining device configured for determining the analyte retention time by considering the initial value of the retention time of the chemical related substance, wherein the evaluation device furthermore comprises at least one peak processor configured for determining at least one initial value for analyte peak shape parameters by determining peak shape parameters of at least one peak of the chemical related substance chromatogram, wherein the evaluation device comprises at least one fitting device configured for determining analyte peak area and analyte peak shape by applying at least one fitting analysis to the chromatogram of the analyte by considering the initial value for analyte peak shape parameters and the analyte retention time.

The processing line may be configured to perform the method according to any one of the preceding embodiments.

For embodiments, the terms used herein and possible definitions, reference may be made to the description of the method above.

As used herein, the term "computer-implementable processing line" is a broad term and is to be given its ordinary and customary meaning to a person of ordinary skill in the art and is not to be limited to a special or customized meaning. The term specifically may refer, without limitation, to a set of sequential operations and/or devices such as computing devices, processors and the like to perform an automatic peak integration. The processing line may be configured for performing the method according to the present disclosure. The processing line may be configured to perform the method steps a) to c) fully automatic.

As used herein, the term "data collector" is a broad term and is to be given its ordinary and customary meaning to a person of ordinary skill in the art and is not to be limited to a special or customized meaning. The term specifically may refer, without limitation, to at least one database configured for receiving and/or storing the at least one chromatogram of the chemical related substance and the at least one chromatogram of the analyte. The receiving and/or storing of the chromatograms of the chemical related substance and analyte may be performed simultaneously or subsequently.

As further used herein, the term "evaluation device" generally refers to an arbitrary device adapted to perform the method steps as described above, typically by using at least one data processing device and, more typically, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the method steps.

As outlined above, the evaluation device comprises the retention time processor. As used herein, the term "retention time processor" is a broad term and is to be given its ordinary and customary meaning to a person of ordinary skill in the art and is not to be limited to a special or customized meaning. The term specifically may refer, without limitation, to a processor configured for performing the determining of the retention time of the chemical related substance, in particular determining of local maxima within the chromatogram of the chemical related substance. The retention time processor may be configured for determining at least one local intensity maximum within a predefined retention time interval for determining the retention time of the chemical related substance. For example, the retention time processor may be configured for determining the local intensity maximum by considering a predefined interval for a quantifier-to-qualifier ratio at the position of the maximum. Additionally or alternatively, the retention time processor may be configured for determining patterns of multiple local maxima within the predefined retention time interval for determining the retention time of the chemical related substance, wherein the patterns have a predefined distance between the maxima. The retention time processor may be configured for determining of the patterns of multiple local maxima by considering a predefined interval for a quantifier-to-qualifier ratio at the position of the maximum, as outlined in detail above with respect to the method.

As further outlined above, the evaluation device comprises the at least one adder configured for adding the retention time of the chemical related substance with a pre-determined or pre-defined constant offset and/or at least one multiplier configured for multiplying the retention time of the chemical related substance with a pre-determined or pre-defined constant factor. The adder and/or the multiplier may be configured as digital circuits or may be implemented as software.

The evaluation device comprises the position determining device configured for determining the analyte retention time by considering the initial value of the retention time of the chemical related substance. As used herein, the term "position determining device" is a broad term and is to be given its ordinary and customary meaning to a person of ordinary skill in the art and is not to be limited to a special or customized meaning. The term specifically may refer, without limitation, to a device such as a processor configured for determining the analyte retention time from the chromatogram of the analyte. The position determining device may be arranged subsequent to the retention time processor and the adder and/or multiplier. Additionally or alternatively, the position determining device may be designed integral with the retention time processor and/or the evaluation device may comprise at least one processor configured for performing both actions, the determining of the initial value for the analyte retention time and the analyte retention time. The position determining device may be configured for determining the analyte retention time by using at least one curve fitting technique, wherein the initial value for analyte retention time is used as start value for the curve fitting. The curve fitting technique may comprise using at least one fit selected from the group consisting of polynomial interpolation, Gauss-Newton algorithm, Fourier-Transformation and the like.

As used herein, the term "peak processor" is a broad term and is to be given its ordinary and customary meaning to a person of ordinary skill in the art and is not to be limited to a special or customized meaning. The term specifically may refer, without limitation, to a processor configured for determining peak shape parameters of at least one peak. The peak processor may be configured for performing at least one fit procedure. The peak processor may be configured for fitting at least one peak of the chemical related substance chromatogram. The fitting may comprise using at least one curve fitting technique such as one or more of polynomial interpolation, Gauss-Newton algorithm, Fourier-Transformation and the like. The peak processor may be configured for determining at least one tolerance interval. The tolerance interval $p\pm\varepsilon$ may be given by the respective determined initial value p for analyte peak shape parameters and an error interval $\pm\varepsilon$.

The peak processor may be arranged subsequent to the retention time processor, the adder and/or multiplier and the position determining device. Additionally or alternatively, the peak processor may be designed integral with the retention time processor and/or position determining device and/or the evaluation device may comprise at least one processor configured for performing the following actions, the determining of the initial value for the analyte retention time and the analyte retention time, determining the peak shape parameters.

As used herein, the term "fitting device" is a broad term and is to be given its ordinary and customary meaning to a person of ordinary skill in the art and is not to be limited to a special or customized meaning. The term specifically may refer, without limitation, to at least one processor configured for determining analyte peak area and analyte peak shape by applying at least one fitting analysis to the chromatogram of the analyte by considering the initial value for analyte peak shape parameters and the analyte retention time. For example, the fitting device may be configured for fitting the analyte chromatogram using at least one exponentially modified Gaussian function. For example, the fitting may comprise using at least one fitting function as described in "Mathematical functions for the representation of chromatographic peaks", Valerio B. Di Marco, G. Giorgio Bombi, Journal of Chromatography A, 931 (2001) 1-30.

The evaluation device furthermore may comprise at least one preprocessor. The preprocessor may be configured for preprocessing the chromatogram of the chemical related substance and/or of the chromatogram of the analyte by one or more of: selecting at least one region of interest in the chromatogram; selecting at least one predefined retention time interval; at least one smoothing step comprising applying one or more of a moving average filter, a Gaussian filter, a discrete wavelet denoising, a Savitzky-Golay smoothing a Loess smoothing; at least one background subtraction step comprising one or more of an asymmetric weighted least squares fit with regularization, applying a morphological top hat filter, a discrete or continuous wavelet base background determination, determining a moving average minima.

In a further aspect of the present disclosure, a mass spectrometry system is disclosed. As used herein, the term "system" is a broad term and is to be given its ordinary and customary meaning to a person of ordinary skill in the art and is not to be limited to a special or customized meaning. The term specifically may refer, without limitation, to a device comprising at least two elements. The elements may interact functionally such as for performing the method according to the present disclosure.

The mass spectrometry system comprises at least one mass spectrometry device comprising at least one mass filter and at least one detector;

at least one computer-implementable processing line according to the present disclosure.

For embodiments, terms used herein and possible definitions, reference may be made to the description of the method and the computer-implementable processing line above.

The mass spectrometry device may be or may comprise at least one liquid chromatography mass spectrometer device. The mass spectrometry device may comprise at least one chromatograph. As used herein, the term "mass filter" is a broad term and is to be given its ordinary and customary meaning to a person of ordinary skill in the art and is not to be limited to a special or customized meaning. The term specifically may refer, without limitation, to at least one device configured for separating components of a sample with respect to their masses. As used herein, the term "detector" is a broad term and is to be given its ordinary and customary meaning to a person of ordinary skill in the art and is not to be limited to a special or customized meaning. The term specifically may refer, without limitation, to at least one device configured for detecting incoming particles and for determining the at least one chromatogram.

The mass spectrometry system furthermore may comprise at least one sample preparation device. As used herein, the term "sample preparation device" is a broad term and is to be given its ordinary and customary meaning to a person of ordinary skill in the art and is not to be limited to a special or customized meaning. The term specifically may refer, without limitation, to a device configured for preparing the sample for subsequent analysis. The sample preparation device may be configured for adding at least one chemical related substance to the sample of the analyte.

The method and devices according to the present disclosure may provide a large number of advantages over known methods and devices for peak integration. In particular, the method and devices allow for reliable automatic peak integration without the need for revision by an expert user or manual adjustment.

Summarizing and without excluding further possible embodiments, the following embodiments may be envisaged:

Embodiment 1: A computer implemented method for automatic peak integration of at least one chromatogram of at least one sample, wherein the sample comprises at least one analyte and at least one chemical related substance, wherein the method comprises the following steps:

a) Retrieving at least one chromatogram of the chemical related substance and at least one chromatogram of the analyte;

b) Evaluating the chromatogram of the chemical related substance, wherein the evaluating comprises b1) determining at least one initial value for analyte retention time by determining retention time of the chemical related substance and adding the retention time of the chemical related substance with a pre-determined or pre-defined constant offset and/or multiplying the retention time of the chemical related substance with a pre-determined or pre-defined constant factor, b2) determining at least one initial value for analyte peak shape parameters by determining peak shape parameters of at least one peak of the chemical related substance chromatogram;

c) Evaluating the chromatogram of the analyte, wherein the evaluating comprises c1) at least one position determining step, wherein the analyte retention time is determined by considering the initial value of the retention time of the chemical related substance;

c2) at least one peak integration step, wherein analyte peak area and analyte peak shape are determined by applying at least one fitting analysis to the chromatogram of the analyte by considering the initial value for analyte peak shape parameters and the analyte retention time.

Embodiment 2: The method according to any of the preceding embodiments, wherein the method steps a) to c) are performed fully automatic.

Embodiment 3: The method according to any one of the preceding embodiments, wherein the determining of the retention time of the chemical related substance comprises determining of at least one local intensity maximum within a predefined retention time interval.

Embodiment 4: The method according to the preceding embodiment, wherein the determining of the local intensity maximum is performed considering a predefined interval for a quantifier-to-qualifier ratio at the position of the maximum.

Embodiment 5: The method according to any one of the preceding embodiments, wherein the determining of the retention time of the chemical related substance comprises determining of patterns of multiple local maxima within the predefined retention time interval, wherein the patterns have a predefined distance between the maxima.

Embodiment 6: The method according to the preceding embodiment, wherein the determining of the patterns of multiple local maxima is performed considering a predefined interval for a quantifier-to-qualifier ratio at the position of the maximum.

Embodiment 7: The method according to any one of the four preceding embodiments, wherein the initial value for analyte retention time is determined by adjusting the pre-defined retention time interval according to the determined local maximum corrected by the pre-determined or pre-defined constant offset and/or the pre-determined or pre-defined constant factor.

Embodiment 8: The method according to any one of the preceding embodiments, wherein the analyte retention time t is determined using a tolerance interval determined from the chemical related substance chromatogram as domain, wherein the tolerance interval t±ε for analyte peak retention time t comprises an error interval of the analyte peak retention time ε, which is set to the respective error interval of peak retention time of the chemical related substance.

Embodiment 9: The method according to any one of the preceding embodiments, wherein the determining of the at least one initial value for analyte peak shape parameters comprises fitting at least one peak of the chemical related substance chromatogram, wherein the fitting comprises using at least one curve fitting technique such as one or more of polynomial interpolation, Gauss-Newton algorithm, Fourier-Transformation and the like.

Embodiment 10: The method according to any one of the preceding embodiments, wherein the analyte retention time is determined by using at least one curve fitting technique, wherein the initial value for analyte retention time is used as start value for the curve fitting.

Embodiment 11: The method according to the preceding embodiment, wherein the curve fitting technique comprises using at least one fit selected from the group consisting of polynomial interpolation, Gauss-Newton algorithm, Fourier-Transformation and the like.

Embodiment 12: The method according to any one of the preceding embodiments, wherein the method comprises determining at least one tolerance interval, wherein the tolerance interval p±ε is given by the respective determined initial value p for analyte peak shape parameters and an error interval±ε.

Embodiment 13: The method according to the preceding embodiment, wherein the error interval of the analyte peak shape parameters±ε is set to the error interval of the peak shape parameters of the chemical related substance.

Embodiment 14: The method according to any one of the preceding embodiments, wherein in the peak integration step the analyte chromatogram is fitted using at least one exponentially modified Gaussian function.

Embodiment 15: The method according to any one of the preceding embodiments, wherein the evaluating of the chromatogram of the chemical related substance and/or of the chromatogram of the analyte comprises at least one preprocessing step, wherein the preprocessing comprises one or more of: selecting at least one region of interest in the chromatogram; selecting at least one predefined retention time interval; at least one smoothing step comprising applying one or more of a moving average filter, a Gaussian filter, a discrete wavelet denoising, a Savitzky-Golay smoothing, a Loess smoothing; at least one background subtraction step comprising one or more of an asymmetric weighted least squares fit with regularization, applying a morphological top hat filter, a discrete or continuous wavelet base background determination, determining a moving average minima.

Embodiment 16: The method according to any one of the preceding embodiments, wherein the method comprises at least one sample preparation step, wherein the at least one chemical related substance is added to the sample of the analyte.

Embodiment 17: A computer-implementable processing line for automatic peak integration of at least one chromatogram of at least one sample, wherein the sample comprises at least one analyte and at least one chemical related substance, wherein the processing line comprises at least one data collector configured for retrieving at least one chromatogram of the chemical related substance and at least one chromatogram of the analyte;

at least one evaluation device configured for evaluating the chromatogram of the chemical related substance and the chromatogram of the analyte, wherein the evaluation device comprises at least one retention time processor configured for determining at least one initial value for analyte retention time by determining retention time of the chemical related substance, wherein the evaluation device comprises at least one adder configured for adding the retention time of the chemical related substance with a pre-determined or pre-defined constant offset and/or at least one multiplier configured for multiplying the retention time of the chemical related substance with a pre-determined or pre-defined constant factor, wherein the evaluation device comprises at least one position determining device configured for determining the analyte retention time by considering the initial value of the retention time of the chemical related substance, wherein the evaluation device furthermore comprises at least one peak processor configured for determining at least one initial value for analyte peak shape parameters by determining peak shape parameters of at least one peak of the chemical related substance chromatogram, wherein the evaluation device comprises at least one fitting device configured for determining analyte peak area and analyte peak shape by applying at least one fitting analysis to the chromatogram of the analyte by considering the initial value for analyte peak shape parameters and the analyte retention time.

Embodiment 18: The processing line according to the preceding embodiment, wherein the processing line is configured for performing the method according to any one of the preceding embodiments referring to a method.

Embodiment 19: The processing line according to the preceding embodiment, wherein the processing line is configured to perform the method steps a) to c) fully automatic.

Embodiment 20: The processing line according to any one of the preceding embodiments referring to a processing line, wherein the retention time processor configured for determining at least one local intensity maximum within a predefined retention time interval for determining the retention time of the chemical related substance.

Embodiment 21: The processing line according to the preceding embodiment, wherein the retention time processor is configured for determining the local intensity maximum by considering a predefined interval for a quantifier-to-qualifier ratio at the position of the maximum.

Embodiment 22: The processing line according to any one of the preceding embodiments referring to a processing line, wherein the retention time processor is configured for determining patterns of multiple local maxima within the predefined retention time interval for determining the retention time of the chemical related substance, wherein the patterns have a predefined distance between the maxima.

Embodiment 23: The processing line according to the preceding embodiment, wherein the retention time processor is configured for determining of the patterns of multiple local maxima by considering a predefined interval for a quantifier-to-qualifier ratio at the position of the maximum.

Embodiment 24: The processing line according to the preceding embodiment, wherein the evaluation device is configured for determining the initial value for analyte retention time by adjusting the predefined retention time interval according to the determined local maximum corrected by the pre-determined or pre-defined constant offset and/or the pre-determined or pre-defined constant factor.

Embodiment 25: The processing line according to any one of the preceding embodiments referring to a processing line, wherein the peak processor is configured for fitting at least one peak of the chemical related substance chromatogram, wherein the fitting comprises using at least one curve fitting technique such as one or more of polynomial interpolation, Gauss-Newton algorithm, Fourier-Transformation and the like.

Embodiment 26: The processing line according to any one of the preceding embodiments referring to a processing line, wherein the position determining device is configured for determining the analyte retention time by using at least one curve fitting technique, wherein the initial value for analyte retention time is used as start value for the curve fitting.

Embodiment 27: The processing line according to the preceding embodiment, wherein the curve fitting technique comprises using at least one fit selected from the group consisting of polynomial interpolation, Gauss-Newton algorithm, Fourier-Transformation and the like.

Embodiment 28: The processing line according to any one of the preceding embodiments referring to a processing line, wherein the peak processor is configured for determining at least one tolerance interval, wherein the tolerance interval p±ε is given by the respective determined initial value p for analyte peak shape parameters and an error interval±ε.

Embodiment 29: The processing line according to any one of the preceding embodiments referring to a processing line, wherein the fitting device is configured for fitting the analyte chromatogram using at least one exponentially modified Gaussian function.

Embodiment 30: The processing line according to any one of the preceding embodiments referring to a processing line, wherein the evaluation device comprises at least one pre-processor, wherein the preprocessor is configured for evaluating preprocessing the chromatogram of the chemical related substance and/or of the chromatogram of the analyte by one or more of: selecting at least one region of interest in the chromatogram; selecting at least one predefined retention time interval; at least one smoothing step comprising applying one or more of a moving average filter, a Gaussian filter, a discrete wavelet denoising, a Savitzky-Golay smoothing, a Loess smoothing; at least one background subtraction step comprising one or more of an asymmetric weighted least squares fit with regularization, applying a morphological top hat filter, a discrete or continuous wavelet base background determination, determining a moving average minima.

Embodiment 31: A mass spectrometry system comprising
at least one mass spectrometry device comprising at least one mass filter and at least one detector;
at least one computer-implementable processing line according to any one of the preceding embodiments referring to a processing line.

Embodiment 32: The mass spectrometry system according to the preceding embodiment, wherein the mass spectrometry system furthermore comprises at least one sample preparation device, wherein the sample preparation device is configured for adding at least one chemical related substance to the sample of the analyte.

In order that the embodiments of the present disclosure may be more readily understood, reference is made to the following examples, which are intended to illustrate the disclosure, but not limit the scope thereof.

FIG. 1 shows a comparison of a method for automated peak integration as known in the art using a fixed retention time window (boxes) with real peak integration using manual review. For lower analyte concentrations the automated method with fixed retention time window leads to incorrect quantification. The erroneous results result from the integration of an incorrect peak due to sample specific retention time shift. Moreover, FIG. 1 shows a comparison of a method for automated peak integration according to the present disclosure with the real peak integration using manual review (circles). Using the method according to the present disclosure ensures to pick the right signal and quantify area ratio correctly.

Figure 2:
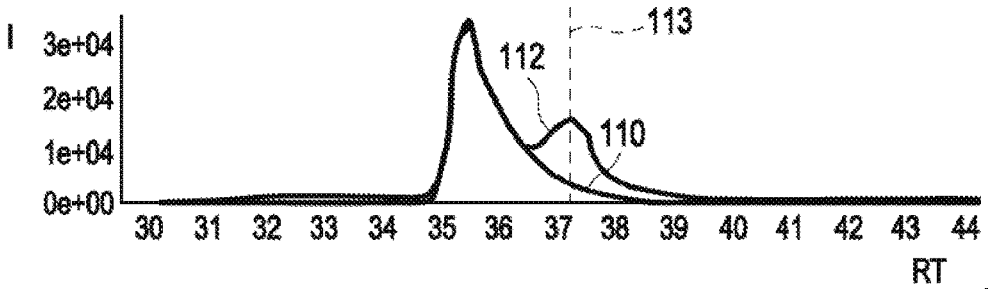
FIGS. 2A, 2B and 2C show peak integration of analyte chromatogram without and with retention time adjustment (FIGS. 2A and B) and chemical related substance chromatogram (FIG. 2C)
Figure 2:
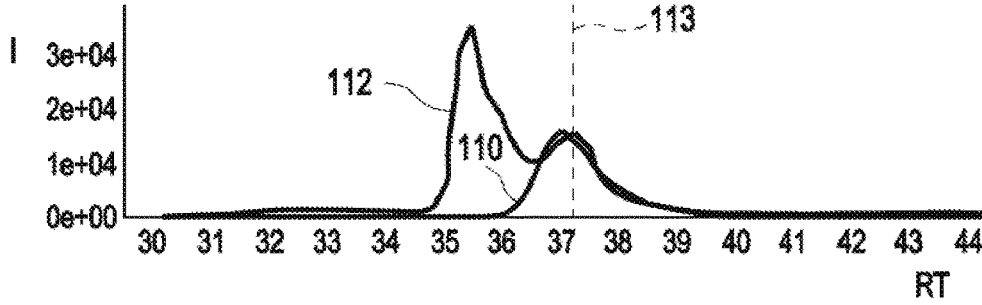
Figure 2:
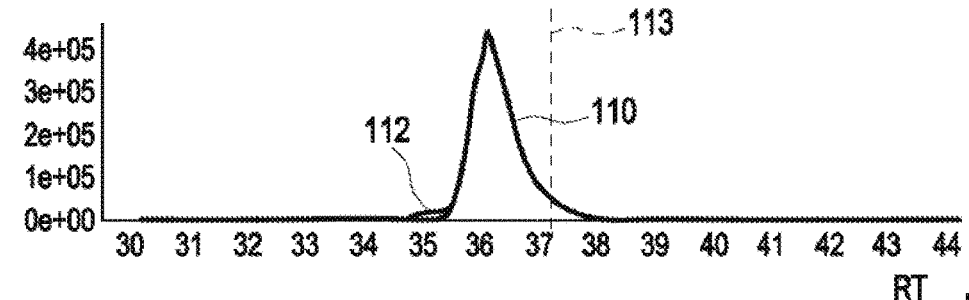

FIGS. 2A to 2C show an example of the effect of retention time (RT) adjustment based on the RT of the internal standard (ISTD). FIGS. 2A and 2B show peak integration of an exemplary analyte chromatogram, wherein on the x axis the retention time RT and on the y axis intensity I is plotted. Lines 112 designate the preprocessed chromatograms of the analyte in FIGS. 2A and 2B and the ISTD in FIG. 2C. Lines 110 designate the integrated area. The vertical dashed line 113 designates the correct location of the analyte peak. While an integration without retention time adjustment fails to capture the correct peak as visible in FIG. 2A, using the internal standard retention time as an input for adjusting the analyte retention time leads to correct integration of the analyte peak, see FIG. 2B.

Figure 3:
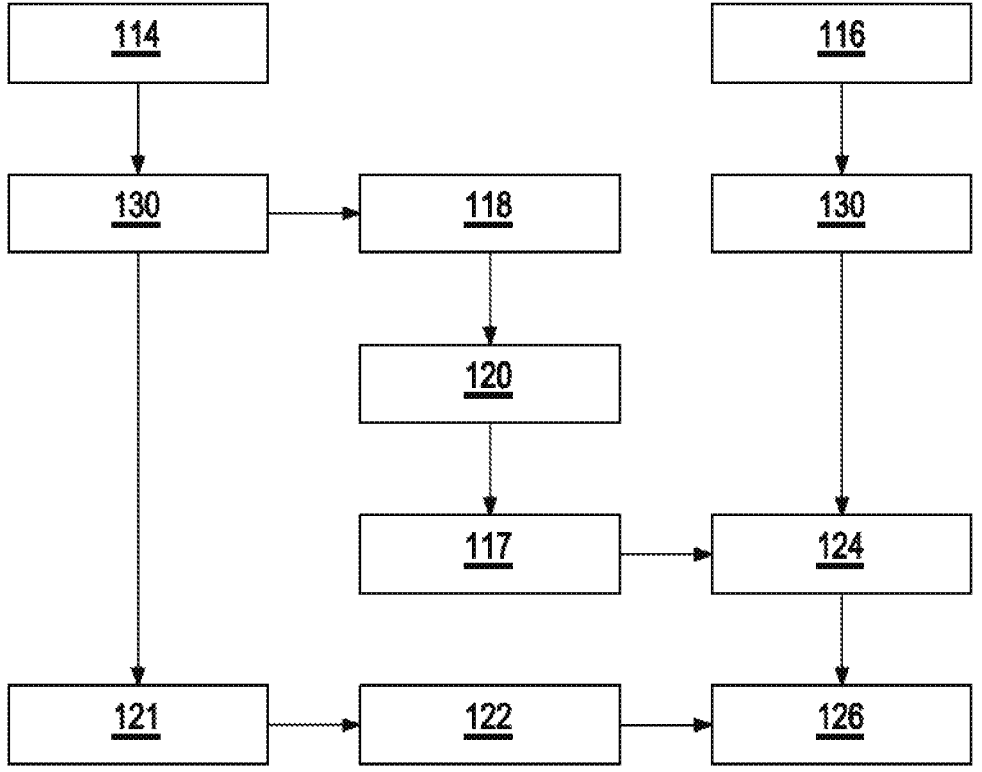
FIG. 3 shows a flowchart of a computer implemented method according to an embodiment of the present disclosure.

FIG. 3 shows a flowchart of an exemplary embodiment of a computer implemented method for automatic peak integration of at least one chromatogram of at least one sample according to the present disclosure. The method may be performed completely automatically, specifically without user interaction. The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises the following steps:
a) retrieving at least one chromatogram of the chemical related substance (denoted with reference number 114) and at least one chromatogram of the analyte (denoted with reference number 116);
b) evaluating the chromatogram of the chemical related substance, wherein the evaluating comprises
b1) determining at least one initial value for analyte retention time (denoted with reference number 117) by determining retention time of the chemical related substance (denoted with reference number 118) and adding the retention time of the chemical related substance with a pre-determined or pre-defined constant offset and/or multiplying the retention time of the chemical related substance with a pre-determined or pre-defined constant factor (denoted with reference number 120),
b2) determining at least one initial value for analyte peak shape parameters (denoted with reference number 122) by determining peak shape parameters of at least one peak of the chemical related substance chromatogram (denoted with reference number 121);

c) evaluating the chromatogram of the analyte, wherein the evaluating comprises c1) at least one position determining step (denoted with reference number 124), wherein the analyte retention time is determined by considering the initial value of the retention time of the chemical related substance;

c2) at least one peak integration step (denoted with reference number 126), wherein analyte peak area and analyte peak shape are determined by applying at least one fitting analysis to the chromatogram of the analyte by considering the initial value for analyte peak shape parameters and the analyte retention time.

The chromatogram may be determined by using at least one mass spectrometry device 128, for example at least one liquid chromatography mass spectrometry device. The liquid chromatography mass spectrometry device may be or may comprise at least one high-performance liquid chromatography (HPLC) device or at least one micro liquid chromatography (μLC) device. The liquid chromatography mass spectrometry device may comprise a liquid chromatography (LC) device and a mass spectrometry (MS) device, wherein the LC device and the MS are coupled via at least one interface. The liquid chromatography (LC) device may be configured for separating one or more analytes of interest of a sample from other components of the sample for detection of the one or more analytes with the mass spectrometry device 128. The LC device may comprise at least one LC column. The mass spectrometry device 128 may be configured for detecting at least one analyte based on mass to charge ratio. The mass spectrometry device 128 may be or may comprise at least one quadrupole mass spectrometry device. The interface coupling the LC device and the MS may comprise at least one ionization source configured for generating of molecular ions and for transferring of the molecular ions into the gas phase.

The integration of the peak may comprise identification and/or measurement of curve characteristics of the chromatogram. The peak integration may comprise one or more of peak detection, peak finding, peak identification, peak fitting, peak evaluation, determining peak start and/or peak end, determining of background, determining of basis line. The peak integration may allow determining of one or more of peak area, retention time, peak height, and peak width. The peak integration may be performed non-manual but by at least one computer and/or computer network and/or machine. Specifically, the automatic peak integration may be performed without manual action or interaction with a user. In particular, peak identification and/or peak detection and/or determining of peak area may be performed non-manual and without manual action or interaction with a user.

The sample may be selected from the group consisting of: a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue, cells or the like. The sample may be used directly as obtained from the respective source or may be subject of a pretreatment and/or sample preparation workflow. The sample comprises at least one analyte and at least one chemical related substance. For example, analytes of interest may be vitamin D, drugs of abuse, therapeutic drugs, hormones, and metabolites in general. The chemical related substance may be a substance having mass to charge ratio similar to the analyte of interest. For example, the chemical related substance may be at least one internal standard and/or at least one substance used as quantifier. The method according to the present disclosure allows for reliable peak integration even for low intensity peaks, high noise levels or frequent interferences. Specifically, the method proposes to use for evaluation of the chromatogram of the analyte of interest input or start values determined from a further chromatogram of a chemical related substance of the same measurement for which sufficient high intensity peaks, low noise level and low frequent interferences can be guaranteed. For example, the method can be used for enhancing integration of an analyte chromatogram on the basis of the results obtained from the chromatogram of the internal standard. For example, the method can be used for enhancing integration of a qualifier chromatogram on the basis of the results obtained from the quantifier chromatogram. The internal standard sample may be a sample comprising at least one internal standard substance with a known such as a pre-determined concentration. Internal standards may be almost identical to the analyte. The internal standard substance may be similar to the analyte of interest such as deuterated molecules or an isotopically labeled version of the analyte of interest. For further details with respect to the sample, reference is made, e.g., to EP 3 425 369 A1, the full disclosure is included herewith by reference. Other analytes of interest are possible.

The sample may be pretreated by adding a chemical related substance and/or by being diluted with another solution and/or by having being mixed with reagents or the like. The method may comprise at least one sample preparation step. In the sample preparation step the at least one chemical related substance may be added to the sample of the analyte. The sample comprising the analyte may be spiked with the chemical related substance. Chemical related substances may be added to the sample with a predefined concentration. The chemical related substance may be selected such that it is easily identifiable under normal operating conditions of the mass spectrometry device. The concentration of the chemical related substance may be pre-determined and significantly higher than the concentration of the analyte.

The retrieving of at least one chromatogram 114 and 116 may comprise one or more of receiving, downloading, accessing, determining, detecting, and recording the at least one chromatogram. For example, the chromatogram may be retrieved by downloading and/or accessing the chromatogram from at least one database such as of a detector or of a cloud. For example, the chromatogram may be retrieved by performing at least one chromatography run. The chromatogram of the chemical related substance may be a chromatogram comprising at least one signal corresponding to the chemical related substance. The chromatogram of the analyte may be a chromatogram comprising at least one signal corresponding to the analyte of interest.

The method may comprise at least one preprocessing step 130, for example for preprocessing one or both of the chromatogram of the chemical related substance or the chromatogram of the analyte. The preprocessing 130 may comprises one or more of: selecting at least one region of interest in the chromatogram; selecting at least one predefined retention time interval; at least one smoothing step comprising applying one or more of a moving average filter, a Gaussian filter, a discrete wavelet denoising, a Savitzky-Golay smoothing a Loess smoothing; at least one background subtraction step comprising one or more of an asymmetric weighted least squares fit with regularization, applying a morphological top hat filter, a discrete or continuous wavelet base background determination, determining a moving average minima.

In step b) the evaluating comprises determining at least one initial value for analyte retention time 117 by determining retention time of the chemical related substance 118. For each sample peak retention time and/or additional peak shape parameters of the chemical related substance such as peak width and/or peak asymmetry may be determined. Due to the measurement principle of the mass spectrometry device, the retention time of the analyte may be either identical to its corresponding chemical related substance or can be calculated from the chemical related substance such as by addition of a constant difference and/or multiplication with a constant factor. Therefore, using the chemical related substance retention time and, if applicable, some constant offset and/or factor may enable correct identification of analyte peaks even if retention time is shifting.

The chemical related substance which is added to the sample with a predefined concentration may be easily identifiable under normal operating condition of the mass spectrometry device 128. The method may comprise performing at least one error check, wherein the chemical related substance signal is tested. The error check may be used to ensure that the correct peak is interpreted as a chemical related substance signal.

The initial value for analyte retention time may be a start value and/or input value for the determination of the analyte retention time 124 from the chromatogram of the analyte. For determining the initial value for analyte retention time 117, firstly, the retention time of the chemical related substance may be determined 118. This may comprise determining of at least one local intensity maximum within a predefined retention time interval. The predefined retention time interval used for determining the retention time of the chemical related substance 118 may depend on one or more of expected retention time of the chemical related substance, resolution of the detector, and the range of retention time shifts which are expected due to aging of the chromatographic column used in the measurement and other influences which may affect the robustness of the chromatographic measurement. The retention time of the determined local intensity maximum may be determined from the chromatogram and may be used, after addition of a constant offset and/or multiplication with a constant factor 120, as initial value for the analyte retention time. The determining of the local intensity maximum may be performed considering a predefined interval for a quantifier-to-qualifier ratio at the position of the maximum. Restriction to such a predefined interval may ensure that the selected local maxima correspond to peaks related to the analyte of interest due to having a quantifier-to-qualifier ratio close to the value which is characteristic for the analyte of interest. Additionally or alternatively, the determining of the retention time of the chemical related substance 118 may comprise determining of patterns of multiple local maxima within the predefined retention time interval, wherein the patterns have a predefined distance between the maxima. Such peak patterns may be characteristic for certain analytes of interest measured with a given LC-MS measurement protocol and can therefore be used to discriminate peaks related to the analyte of interest from peaks related to other substances. The determining of the patterns of multiple local maxima may be performed considering a predefined interval for a quantifier-to-qualifier ratio at the position of the maximum.

The evaluating comprises adding the retention time of the chemical related substance with a pre-determined or pre-defined constant offset and/or multiplying the retention time of the chemical related substance with a pre-determined or pre-defined constant factor 120. For example, the retention time of the chemical related substance may be $t_1$, wherein initial value for analyte retention time $t_{ini}$ may be determined by $t_{ini}=t_1+t_{off}$, wherein $t_{off}$ is the constant offset. The constant offset may be pre-determined or pre-defined by comparing the determined retention time of the chemical related substance with at least one predicted or expected retention time of the chemical related substance. The predicted or expected retention time of the chemical related substance may be a known retention time for the chemical related substance such pre-defined or pre-determined retention time under certain conditions, in particular temperature conditions. For example, the comparing may comprise subtracting the determined retention time of the chemical related substance from the predicted or expected retention time. A deviation of the predicted or expected retention time from the determined retention time of the chemical related substance may be used as constant offset. For example, the retention time of the chemical related substance may be $t_1$, wherein initial value for analyte retention time $t_{ini}$ may be determined by $t_{ini}=t_1 * t_{fac}$, wherein $t_{fac}$ is the constant factor. The constant factor may be pre-determined or pre-defined by comparing determined retention time of the chemical related substance with at least one predicted or expected retention time of the chemical related substance. The predicted or expected retention time of the chemical related substance may be a known retention time for the chemical related substance such as pre-defined or pre-determined retention time under certain conditions, in particular temperature conditions. For example, the comparing may comprise generating at least one ratio of the determined retention time of the chemical related substance and the predicted or expected retention time. The ratio of the predicted or expected retention time and the determined retention time of the chemical related substance may be used as constant factor. The use of a constant offset may lead to satisfactory results for small retention time shifts that occur, e.g., due to external factors such as varying instrument temperature or limited accuracy of the gradient settings in the chromatographic method. For effects which may cause larger retention time shifts such as LC column aging, the use of a constant factor may offer superior performance compared to applying a constant offset. As outlined above, the determining of the initial value for analyte retention time may comprise determining of the at least one local intensity maximum within the predefined retention time interval. The initial value for analyte retention time may be determined by adjusting the predefined retention time interval according to the determined local maximum corrected by the pre-determined or pre-defined constant offset and/or the pre-determined or pre-defined constant factor.

The evaluation of the chromatogram of the chemical related substance comprises determining at least one initial value for analyte peak shape parameters 122 by determining peak shape parameters of at least one peak of the chemical related substance chromatogram 121. Similar to peak retention time, the measurement principle of the mass spectrometry device 128 may lead to the analyte peak shape being similar to the chemical related substance peak shape due to the similarity of both compounds. As outlined above, the chemical related substance signal is very well controlled since this compound is added to the sample at a predefined and relatively high concentration such that reliable peak shape fit results are ensured. The result of the chemical related substance shape can be used as an input to the subsequent shape determination for the analyte of interest and tight constraints on deviations from this input can be placed due to the known similarity of chemical related substance and analyte peak shapes. The initial value for analyte peak shape parameters may be start values and/or input values for the determination of the analyte peak shape from the chromatogram of the analyte. The determining of the at least one initial value for analyte peak shape parameters may comprise fitting at least one peak of the chemical related substance chromatogram. The fitting may comprise using at least one curve fitting technique such as one or more of polynomial interpolation, Gauss-Newton algorithm, Fourier-Transformation and the like. For example, the chromatogram of the chemical related substance may be fitted using at least one exponentially modified Gaussian function. For example, the fitting may comprise using at least one fitting function as described in "Mathematical functions for the representation of chromatographic peaks", Valerio B. Di Marco, G. Giorgio Bombi, Journal of Chromatography A, 931 (2001) 1-30. Using one or more of these curve fitting techniques a peak is fitted for the chemical related substance chromatogram. From the curve fitting techniques, peak parameters of the chemical related substance peak can be determined. The peak parameters may comprise one or more of peak width, peak asymmetry, peak position, basis line and the like. The determined peak parameters from the chromatogram of the chemical related substance may be used to estimate the peak parameters of the analyte peak by expanding them to an interval with so-called tolerance intervals.

The method may comprise determining at least one tolerance interval of the respective peak parameter. The tolerance interval $p \pm \varepsilon$ may be given by the respective determined initial value p for analyte peak shape parameters and an error interval $\varepsilon$. The error interval may depend on resolution of the detector, fit error, and the level of chemical similarity of the chemical related substance and analyte of interest, e.g., whether deuterated, C13-labeled or other chemical related substance is used. For example, the use of a deuterated chemical related substance may require to set a wider error interval compared to a C13-labeled chemical related substance.

The method comprises evaluating the chromatogram of the analyte. The evaluating of the chromatogram of the analyte may comprise the at least one preprocessing step 130. The preprocessing may comprise one or more of: selecting at least one region of interest in the chromatogram; selecting at least one predefined retention time interval; at least one smoothing step comprising applying one or more of a moving average filter, a Gaussian filter, a discrete wavelet denoising, a Savitzky-Golay smoothing, a Loess smoothing; at least one background subtraction step comprising one or more of an asymmetric weighted least squares fit with regularization, applying a morphological top hat filter, a discrete or continuous wavelet base background determination, determining a moving average minima. The preprocessing can be identical or different to the preprocessing applied to the chromatogram of the chemical related substance.

The evaluating comprises the position determining step 124, wherein the analyte retention time is determined by considering the initial value of the retention time of the chemical related substance. The analyte retention time may be determined by using at least one curve fitting technique. The initial value for analyte retention time may be used as start value for the curve fitting. Given the initial value of the analyte retention time determined from the chemical related substance chromatogram the analyte retention time can be determined, e.g., by using at least one curve fitting technique. The fitting may comprise using at least one curve fitting technique such as one or more of polynomial interpolation, Gauss-Newton algorithm, Fourier-Transformation and the like. For example, the fitting may comprise using at least one fitting function as described in "Mathematical functions for the representation of chromatographic peaks", Valerio B. Di Marco, G. Giorgio Bombi, Journal of Chromatography A, 931 (2001) 1-30. The analyte retention time may be determined using a narrow tolerance interval around the initial value of the retention time. For example, the tolerance interval $t \pm \varepsilon_t$ is given by the respective determined initial value t for analyte peak retention time and an error interval $\pm \varepsilon_t$. The error interval may depend on resolution of the detector, the chromatographic peak width of the analyte of interest and the chemical related substance, the level of chemical similarity of the chemical related substance and analyte of interest, e.g., whether deuterated, C13-labeled or other chemical related substance is used, and the chromatographic noise level. Chromatograms with high noise level may, e.g., require a wider error interval.

The evaluating further comprises the peak integration step 126, wherein analyte peak area and analyte peak shape are determined by applying at least one fitting analysis to the chromatogram of the analyte by considering the initial value for analyte peak shape parameters and the analyte retention time. Using the determined analyte retention time and the initial value of the analyte peak shape parameters a curve can be fitted to the chromatogram of the analyte to determine the analyte peak area and peak shape. In the peak integration step the analyte chromatogram may be fitted using at least one exponentially modified Gaussian function. For example, the fitting may comprise using at least one fitting function as described in "Mathematical functions for the representation of chromatographic peaks", Valerio B. Di Marco, G. Giorgio Bombi, Journal of Chromatography A, 931 (2001) 1-30. The analyte peak area and analyte peak shape may be determined using the tolerance interval $p \pm \varepsilon$ around the initial value of the respective analyte peak shape parameter, as described above.

Use of retention time and peak shape parameters of the chemical related substance for evaluating the analyte chromatogram may lead to more accurate analyte peak area determination especially in case of low analyte concentration, complex background, high noise level and interference peaks. Thus, the method according to the present disclosure enables reliable automation of peak integration without the need for revision by an expert user and manual adjustment.

Figure 4:
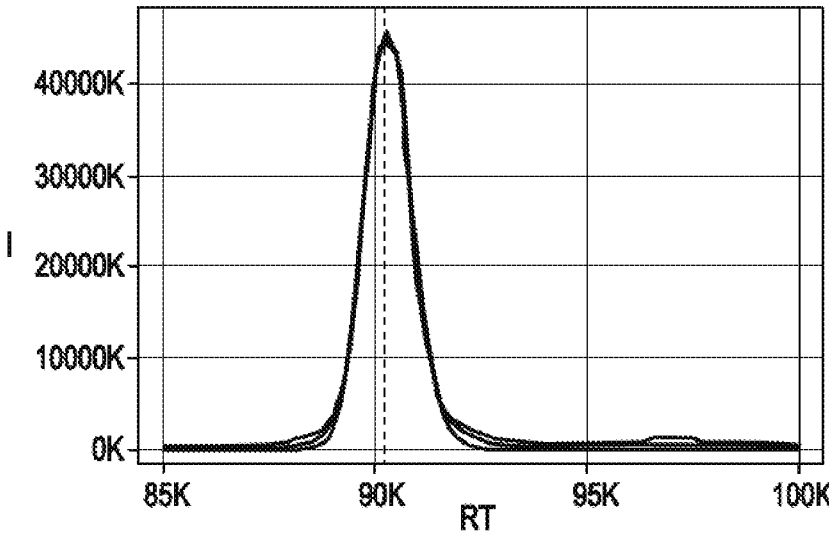
FIGS. 4A, 4B and 4C show use of chemical related substance peak characteristics for analyte quantitation.
Figure 4:
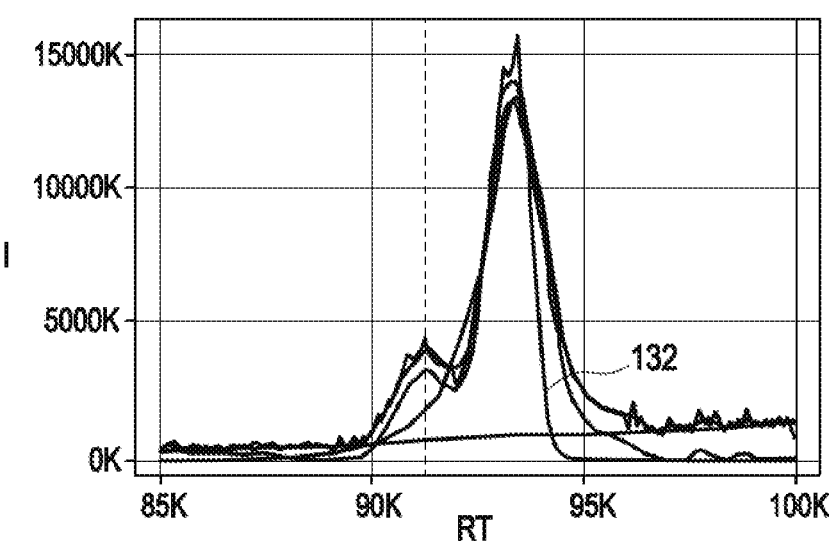
Figure 4:
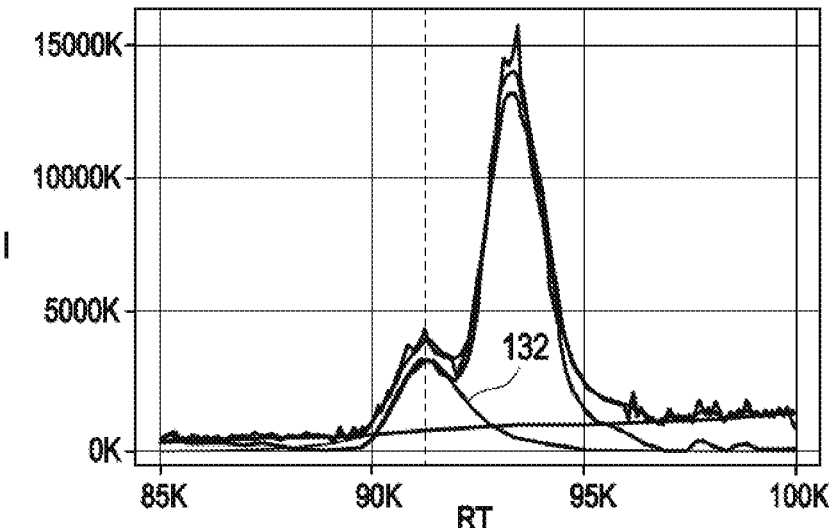

FIGS. 4A to 4C show use of chemical related substance peak characteristics for analyte quantitation. FIG. 4A shows the chemical related substance chromatogram, in this case the internal standard chromatogram, used for determining peak shape and retention time parameters. FIG. 4B shows a method for peak integration with a fixed retention time window and which does not consider the determined peak shape and retention time of the chemical related substance chromatogram. The presence of an interference peak next to the analyte peak, dashed line, leads to an incorrect result of the analyte peak shape 132. FIG. 4C shows that use of the chemical related substance shape parameters enables correct quantitation of the analyte peak 132 even in the presence of an interference peak.

Figure 5:
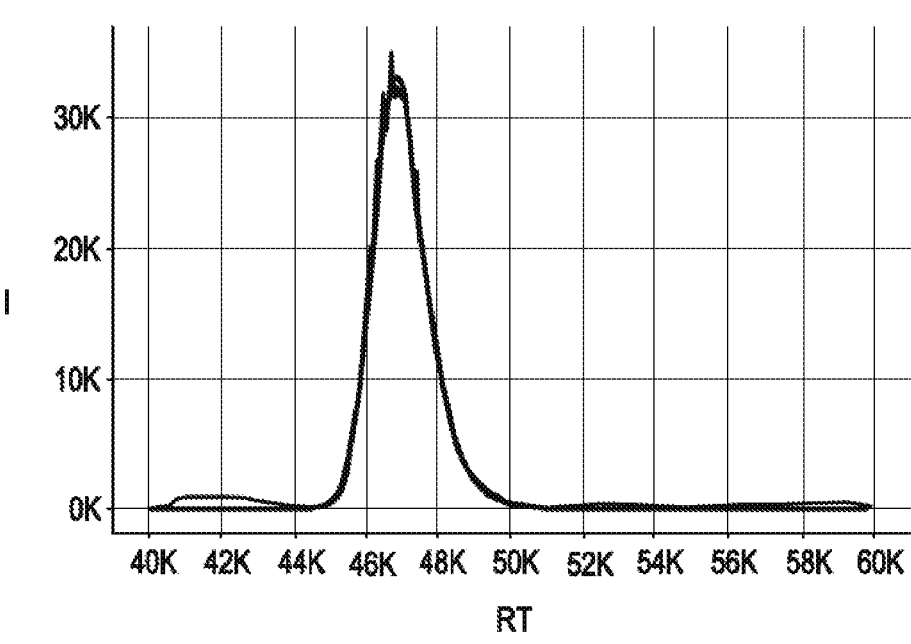
FIGS. 5A and 5B show chemical related substance chromatogram with fitted peak shape (FIG. 5A) and resulting peak fit of analyte chromatogram (FIG. 5B)
Figure 5:
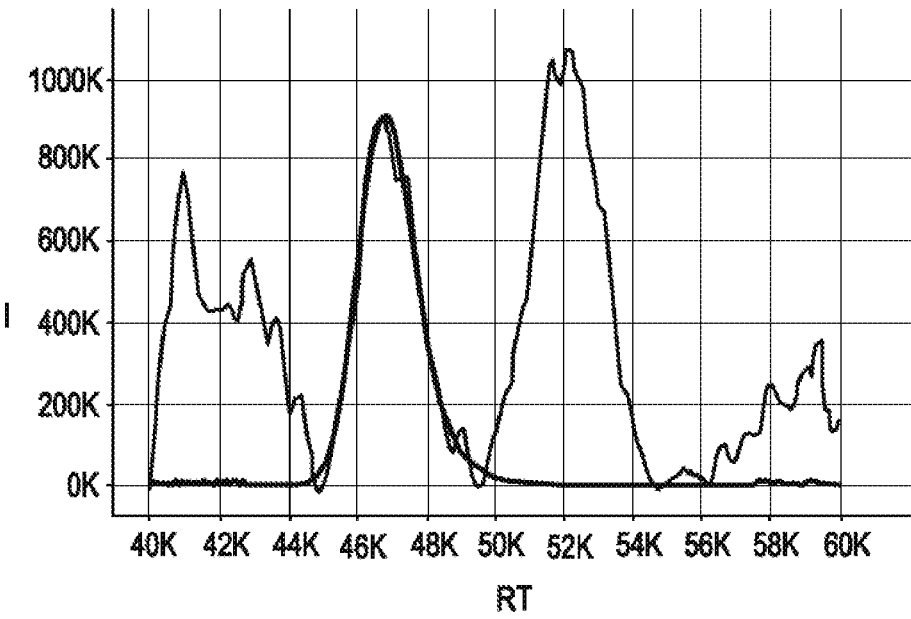

FIG. 5A shows a further exemplary chemical related substance chromatogram, in this case the chromatogram of the internal standard, with the fit result. In this embodiment the fit result may be a peak width of 2950 and peak asymmetry of 0.1. These peak shape parameters may be used to estimate the peak parameters of the analyte by expanding them into the so-called tolerance interval, e.g., peak width 2950±20% and peak asymmetry=0.1±50%. The retention time derived from this internal standard chromatogram may be 4700. The analyte retention time may be determined from the chromatogram shown in FIG. 5B using a narrow tolerance interval around the initial value of the retention time. For example, the tolerance interval t±ε, is given by the respective determined initial value t for analyte peak retention time and an error interval±ε,. For example, in the example shown in FIGS. 5A and B the tolerance interval may be ±0.1%. FIG. 5B further shows the resulting peak fit of analyte chromatogram using the method according to the present disclosure. The analyte fit results may be a peak width of 2890, peak asymmetry 0.12 and peak retention time 47100.

Figure 6:
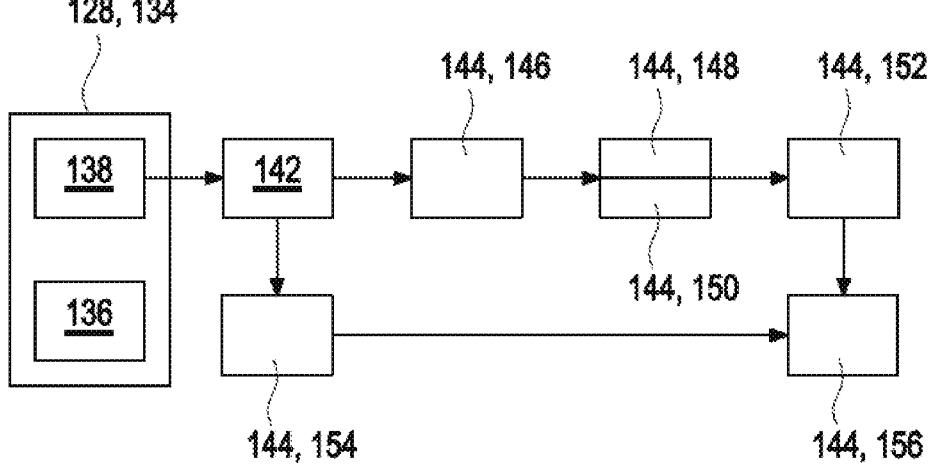
FIG. 6 shows an embodiment of a mass spectrometry system according to an embodiment of the present disclosure.

FIG. 6 shows an embodiment of a mass spectrometry system 134 according to the present disclosure in a highly schematic fashion. The mass spectrometry system 134 comprises at least one mass spectrometry device 128 comprising at least one mass filter 136 and at least one detector 138. The mass spectrometry device may be or may comprise at least one liquid chromatography mass spectrometer device. The mass spectrometry device 128 may comprise at least one chromatograph. The mass filter 136 may be configured for separating components of a sample with respect to their masses. The detector 138 may be configured for detecting incoming particles and for determining the at least one chromatogram. The mass spectrometry system 134 further comprises at least one computer-implementable processing line 140 for automatic peak integration of at least one chromatogram of at least one sample according to the present disclosure.

The processing line 140 comprises at least one data collector 142 configured for retrieving at least one chromatogram of the chemical related substance and at least one chromatogram of the analyte;

at least one evaluation device 144 configured for evaluating the chromatogram of the chemical related substance and the chromatogram of the analyte, wherein the evaluation device 144 comprises at least one retention time processor 146 configured for determining at least one initial value for analyte retention time by determining retention time of the chemical related substance, wherein the evaluation device 144 comprises at least one adder 148 configured for adding the retention time of the chemical related substance with a pre-determined or pre-defined constant offset and/or at least one multiplier 150 configured for multiplying the retention time of the chemical related substance with a pre-determined or pre-defined constant factor, wherein the evaluation device 144 comprises at least one position determining device 152 configured for determining the analyte retention time by considering the initial value of the retention time of the chemical related substance, wherein the evaluation device 144 furthermore comprises at least one peak processor 154 configured for determining at least one initial value for analyte peak shape parameters by determining peak shape parameters of at least one peak of the chemical related substance chromatogram, wherein the evaluation device 144 comprises at least one fitting device 156 configured for determining analyte peak area and analyte peak shape by applying at least one fitting analysis to the chromatogram of the analyte by considering the initial value for analyte peak shape parameters and the analyte retention time.

The data collector 142 may be or may comprise at least one database configured for receiving and/or storing the at least one chromatogram of the chemical related substance and the at least one chromatogram of the analyte. The receiving and/or storing of the chromatograms of the chemical related substance and analyte may be performed simultaneously or subsequently.

The evaluation device 144 may comprise at least one data processing device having a software code stored thereon comprising a number of computer commands. The evaluation device 144 may provide one or more hardware elements for performing one or more of the named operations and/or may provide one or more processors with software running thereon for performing one or more of the method steps.

The retention time processor 146 may be a processor configured for performing the determining of the retention time of the chemical related substance, in particular determining of local maxima within the chromatogram of the chemical related substance. The retention time processor 146 may be configured for determining at least one local intensity maximum within a predefined retention time interval for determining the retention time of the chemical related substance. For example, the retention time processor 146 may be configured for determining the local intensity maximum by considering a predefined interval for a quantifier-to-qualifier ratio at the position of the maximum. Additionally or alternatively, the retention time processor 146 may be configured for determining patterns of multiple local maxima within the predefined retention time interval for determining the retention time of the chemical related substance, wherein the patterns have a predefined distance between the maxima. The retention time processor 146 may be configured for determining the patterns of multiple local maxima by considering a predefined interval for a quantifier-to-qualifier ratio at the position of the maximum, as outlined in detail above with respect to the method.

The adder 148 and/or the multiplier 150 may be configured as digital circuits or may be implemented as software.

The position determining device 152 may be configured for determining the analyte retention time from the chromatogram of the analyte. The position determining device 152 may be arranged subsequent to the retention time processor 146 and the adder 148 and/or multiplier 150. Additionally or alternatively, the position determining device 152 may be designed integral with the retention time processor 146 and/or the evaluation device 144 may comprise at least one processor configured for performing both actions, the determining of the initial value for the analyte retention time and the analyte retention time. The position determining device 152 may be configured for determining the analyte retention time by using at least one curve fitting technique, wherein the initial value for analyte retention time is used as start value for the curve fitting. The curve fitting technique may comprise using at least one fit selected from the group consisting of polynomial interpolation, Gauss-Newton algorithm, Fourier-Transformation and the like.

The peak processor 154 may be configured for performing at least one fit procedure. The peak processor 154 may be configured for fitting at least one peak of the chemical related substance chromatogram. The fitting may comprise using at least one curve fitting technique such as one or more of polynomial interpolation, Gauss-Newton algorithm, Fourier-Transformation and the like. The peak processor 154 may be configured for determining the tolerance interval. The tolerance interval p±ε may be given by the respective determined initial value p for analyte peak shape parameters and an error interval±ε.

The peak processor 154 may be arranged subsequent to the retention time processor 146, the adder 148 and/or multiplier 150 and the position determining device 152. Additionally or alternatively, the peak processor 154 may be designed integral with the retention time processor 146 and/or position determining device 152 and/or the evaluation device 144 may comprise at least one processor configured for performing the following actions, the determining of the initial value for the analyte retention time and the analyte retention time, determining the peak shape parameters.

The fitting device 156 may be configured for fitting the analyte chromatogram using at least one exponentially modified Gaussian function. For example, the fitting may comprise using at least one fitting function as described in "Mathematical functions for the representation of chromatographic peaks", Valerio B. Di Marco, G. Giorgio Bombi, Journal of Chromatography A, 931 (2001) 1-30.

The evaluation device 144 furthermore may comprise at least one preprocessor. The preprocessor may be configured for preprocessing the chromatogram of the chemical related substance and/or of the chromatogram of the analyte by one or more of: selecting at least one region of interest in the chromatogram; selecting at least one predefined retention time interval; at least one smoothing step comprising applying one or more of a moving average filter, a Gaussian filter, a discrete wavelet denoising, a Savitzky-Golay smoothing, a Loess smoothing; at least one background subtraction step comprising one or more of an asymmetric weighted least squares fit with regularization, applying a morphological top hat filter, a discrete or continuous wavelet base background determination, determining a moving average minima.

LIST OF REFERENCE NUMBERS

110 curve
112 curve
113 line
114 retrieving chromatogram of the chemical related substance
116 retrieving chromatogram of the analyte
117 determining initial value for analyte retention time
118 determining retention time of the chemical related substance
120 adding and/or multiplying
121 determining peak shape parameters of the chemical related substance
122 determining initial value for analyte peak shape parameters
124 position determining step
126 peak integration step
128 mass spectrometry device
130 preprocessing step
132 analyte peak shape
134 mass spectrometry system
136 mass filter
138 detector
140 computer-implementable processing line
142 data collector
144 evaluation device
146 retention time processor
148 adder
150 multiplier
152 position determining device
154 peak processor
156 fitting device

What is claimed is:

1. A computer implemented method for automatic peak integration of at least one chromatogram of at least one sample, wherein the sample comprises at least one analyte and at least one chemical related substance, wherein the method comprises the following steps:

a) retrieving at least one chromatogram of the chemical related substance and at least one chromatogram of the analyte, wherein retrieving the at least one chromatogram comprises pretreating the sample by adding the chemical related substance at a predefined concentration that is higher than a concentration of the analyte and performing at least one chromatography run on the sample by a mass spectrometry device that includes a detector and a mass filter, wherein the mass spectrometry device is coupled to a liquid chromatography device configured to separate the analyte of the sample from other components of the sample for detection, and wherein the mass spectrometry device is coupled to the liquid chromatography device through an interface that includes an ionization source configured to generate molecular ions and transfer the molecular ions to a gas phase;

b) evaluating the chromatogram of the chemical related substance, wherein the evaluating comprises b1) determining at least one initial value for analyte retention time by determining retention time of the chemical related substance, including determining a local intensity maximum within a predefined retention time interval based on a quantifier-to-qualifier ratio that is determined to be a characteristic quantifier-to-qualifier ratio of the analyte of the sample and one or both of adding the retention time of the chemical related substance with a pre-determined or pre-defined constant offset or multiplying the retention time of the chemical related substance with a pre-determined or pre-defined constant factor based on a retention time shift of the retention time of the chemical related substance, b2) determining at least one initial value for analyte peak shape parameters by determining peak shape parameters of at least one peak of the chemical related substance chromatogram; and c) evaluating the chromatogram of the analyte, wherein the evaluating comprises c1) at least one position determining step, wherein the analyte retention time is determined by applying a tolerance interval based on the initial value of the retention time of the chemical related substance, and c2) at least one peak integration step, wherein analyte peak area and analyte peak shape are determined by applying at least one fitting analysis to the chromatogram of the analyte by considering the initial value for analyte peak shape parameters and the analyte retention time.

2. The method according to claim 1, wherein the method steps a) to c) are performed fully automatic.

3. The method according to claim 1, wherein the determining of the retention time of the chemical related substance comprises determining of patterns of multiple local maxima within the predefined retention time interval, wherein the patterns have a predefined distance between the maxima.

4. The method according to claim 3, wherein the determining of the patterns of multiple local maxima is performed considering a predefined interval for the quantifier-to-qualifier ratio at the position of the maximum.

5. The method according to claim 1, wherein the initial value for analyte retention time is further determined by adjusting the predefined retention time interval according to the determined local maximum corrected by one or both of the pre-determined or pre-defined constant offset or the pre-determined or pre-defined constant factor.

6. The method according to claim 1, wherein the analyte retention time t is determined using the tolerance interval and the tolerance interval is determined from the chemical related substance chromatogram as domain, wherein the tolerance interval $t\pm\varepsilon$ for analyte peak retention time t comprises an error interval of the analyte peak retention time $\varepsilon$, which is set to the respective error interval of peak retention time of the chemical related substance.

7. The method according to claim 1, wherein the determining of the at least one initial value for analyte peak shape parameters comprises fitting at least one peak of the chemical related substance chromatogram, wherein the fitting comprises using at least one curve fitting technique selected from polynomial interpolation, Gauss-Newton algorithm, and Fourier-Transformation.

8. The method according to claim 1, wherein the analyte retention time is determined by using at least one curve fitting technique, wherein the initial value for analyte retention time is used as start value for the curve fitting.

9. The method according to claim 8, wherein the curve fitting technique comprises using at least one fit selected from the group consisting of polynomial interpolation, Gauss-Newton algorithm, and Fourier-Transformation.

10. The method according to claim 1, wherein the tolerance interval is a first tolerance interval and the method comprises determining a second tolerance interval, wherein the second tolerance interval $p\pm\varepsilon$ is given by the respective determined initial value p for analyte peak shape parameters and an error interval $\pm\varepsilon$.

11. The method according to claim 10, wherein the error interval of the analyte peak shape parameters $\pm\varepsilon$ is set to the error interval of the peak shape parameters of the chemical related substance.

12. The method according to claim 1, wherein in the peak integration step the analyte chromatogram is fitted using at least one exponentially modified Gaussian function.

13. The method according to claim 1, wherein the evaluating one or both of the chromatogram of the chemical related substance or of the chromatogram of the analyte comprises at least one preprocessing step, wherein the preprocessing comprises one or more of: selecting at least one region of interest in the chromatogram; at least one smoothing step comprising applying one or more of a moving average filter, a Gaussian filter, a discrete wavelet denoising, a Savitzky-Golay smoothing, a Loess smoothing; at least one background subtraction step comprising one or more of an asymmetric weighted least squares fit with regularization, applying a morphological top hat filter, a discrete or continuous wavelet base background determination, and/or determining a moving average minima.

14. The method of claim 1, further comprising determining the predefined retention time interval based on a chromatographic noise level.

15. The method of claim 14, further comprising determining the predefined retention time interval based further on a determined level of chemical similarity of the chemical related substance and the analyte of the sample.

16. A computer-implemented processing line for automatic peak integration of at least one chromatogram of at least one sample, wherein the sample comprises at least one analyte and at least one chemical related substance, and wherein the processing line comprises:

at least one data collector configured for retrieving at least one chromatogram of the chemical related substance and at least one chromatogram of the analyte; and at least one evaluation device configured for evaluating the chromatogram of the chemical related substance and the chromatogram of the analyte;

wherein the evaluation device comprises at least one retention time hardware processor configured for determining at least one initial value for analyte retention time by determining retention time of the chemical related substance, including determining a local intensity maximum within a predefined retention time interval based on a quantifier-to-qualifier ratio that is determined to be a characteristic quantifier-to-qualifier ratio of the analyte of the sample, wherein the evaluation device comprises one or both of at least one adder digital circuit configured for adding the retention time of the chemical related substance with a pre-determined or pre-defined constant offset or at least one multiplier digital circuit configured for multiplying the retention time of the chemical related substance with a pre-determined or pre-defined constant factor based on a retention time shift of the retention time of the chemical related substance, wherein the evaluation device comprises at least one position determining device configured for determining the analyte retention time by applying a tolerance interval based on the initial value of the retention time of the chemical related substance, wherein the evaluation device furthermore comprises at least one peak hardware processor configured for determining at least one initial value for analyte peak shape parameters by determining peak shape parameters of at least one peak of the chemical related substance chromatogram, and wherein the evaluation device comprises at least one fitting device configured for determining analyte peak area and analyte peak shape by applying at least one fitting analysis to the chromatogram of the analyte by considering the initial value for analyte peak shape parameters and the analyte retention time, wherein the processing line is integrated into a mass spectrometry device that is coupled to a liquid chromatography device configured to separate the analyte of the sample from other components of the sample for detection, and the mass spectrometry device is coupled to the liquid chromatography device through an interface that includes an ionization source configured to generate molecular ions and transfer the molecular ions to a gas phase.

17. A mass spectrometry system comprising at least one mass spectrometry device comprising at least one mass filter and at least one detector; and at least one computer-implementable processing line according to claim 16.

* * * * *